US012789991B2

(12) United States Patent
Treadway et al.

(10) Patent No.: US 12,789,991 B2
(45) **Date of Patent: *Nov. 10, 2026**

(54) PROJECTILE DELIVERY SYSTEMS AND WEAPONIZED AERIAL VEHICLES AND METHODS INCLUDING SAME

(71) Applicant: Corvid Technologies LLC, Mooresville, NC (US)

(72) Inventors: Sean Kevin Treadway, Mooresville, NC (US); Michael John Worsham, Mooresville, NC (US)

(73) Assignee: CORVID TECHNOLOGIES LLC, Mooresville, NC (US)

(*) Notice: Subject to any disclaimer, the term of this patent is extended or adjusted under 35 U.S.C. 154(b) by 52 days.

This patent is subject to a terminal disclaimer.

(21) Appl. No.: 18/746,571

(22) Filed: Jun. 18, 2024

(65) Prior Publication Data

US 2026/0048842 A1 Feb. 19, 2026

Related U.S. Application Data

(63) Continuation-in-part of application No. 18/314,961, filed on May 10, 2023, now Pat. No. 12,049,316, (Continued)

(51) Int. Cl.
*B64D 1/04* (2006.01)
*B64C 39/02* (2023.01)

(Continued)

(52) U.S. Cl.
CPC .............. *B64D 1/04* (2013.01); *B64C 39/024* (2013.01); *F41G 9/02* (2013.01); *F42B 10/64* (2013.01);

(Continued)

(58) Field of Classification Search
CPC ... F42B 10/64; F41F 3/065; F41F 5/00; F41G 9/02

(Continued)

(56) References Cited

U.S. PATENT DOCUMENTS

| | | | | |
|---|---|---|---|---|
| 2,397,088 A | | 3/1946 | Clay | |
| 3,137,233 A | * | 6/1964 | Lipinski | F42B 12/10 102/476 |

(Continued)

FOREIGN PATENT DOCUMENTS

| | | | |
|---|---|---|---|
| DE | 102010010508 B4 | | 11/2013 |
| WO | 2017027836 A1 | | 2/2017 |
| WO | 2018111282 A1 | | 6/2018 |

*Primary Examiner* — Bret Hayes

(74) *Attorney, Agent, or Firm* — Myers Bigel, P.A.

(57) ABSTRACT

A weaponized aerial vehicle includes an aerial vehicle and a projectile delivery system mounted on the aerial vehicle for flight therewith. The projectile delivery system includes a projectile and a base system. The projectile includes: a projectile body; an onboard steering system including a steering mechanism operable to change an attitude, orientation, and/or direction of flight of the projectile, and a steering actuator operable to control the steering mechanism; and an energetic payload. The base system includes: a projectile holder; a target tracking system; and a projectile guidance system including a projectile tracking system and a projectile control system. The base system is configured to: release the projectile from the projectile holder such that the projectile is driven toward a target by gravity; track the target; track the released projectile; and automatically control the onboard steering system of the projectile to steer the projectile to the target.

56 Claims, 30 Drawing Sheets

Related U.S. Application Data which is a continuation of application No. 17/544,305, filed on Dec. 7, 2021, now Pat. No. 11,685,527.

(60) Provisional application No. 63/127,703, filed on Dec. 18, 2020.

(51) Int. Cl.

| | |
|---|---|
| ***F41G 9/02*** | (2006.01) |
| ***F42B 10/64*** | (2006.01) |
| ***F42B 10/66*** | (2006.01) |
| ***F42B 15/01*** | (2006.01) |
| ***G05D 1/00*** | (2006.01) |
| ***G05D 1/12*** | (2006.01) |
| ***G05D 1/686*** | (2024.01) |
| *B64U 101/15* | (2023.01) |
| *B64U 101/30* | (2023.01) |

(52) U.S. Cl.

CPC ............ *F42B 10/663* (2013.01); *F42B 15/01* (2013.01); *G05D 1/12* (2013.01); *G05D 1/686* (2024.01); *B64U 2101/15* (2023.01); *B64U 2101/30* (2023.01)

(58) Field of Classification Search

USPC ...................... 89/1.51, 1.54, 1.56, 1.58, 1.59

See application file for complete search history.

(56) References Cited

U.S. PATENT DOCUMENTS

| | | | | |
|---|---|---|---|---|
| H58 | H * | 5/1986 | Smith | 102/501 |
| 5,779,190 | A | 7/1998 | Rambo et al. | |
| 5,834,684 | A | 11/1998 | Taylor | |
| 6,056,237 | A | 5/2000 | Woodland | |
| 7,610,841 | B2 | 11/2009 | Padan | |
| 7,690,304 | B2 | 4/2010 | Roemerman et al. | |
| 8,661,980 | B1 | 3/2014 | Roemerman et al. | |
| 8,708,285 | B1 | 4/2014 | Carreiro | |
| 9,085,362 | B1 | 7/2015 | Kilian et al. | |
| 9,121,669 | B1 | 9/2015 | Hyslop et al. | |
| 9,127,908 | B2 | 9/2015 | Miralles | |
| 9,434,471 | B2 | 9/2016 | Arlton et al. | |
| 11,685,527 | B2 | 6/2023 | Treadway et al. | |
| 12,049,316 | B2 * | 7/2024 | Treadway | F41G 7/308 |
| 2002/0017214 | A1 * | 2/2002 | Jacoby | F42B 1/028 102/307 |
| 2010/0198514 | A1 | 8/2010 | Miralles | |
| 2010/0258672 | A1 | 10/2010 | Grabmeier et al. | |
| 2012/0061508 | A1 | 3/2012 | De et al. | |
| 2012/0210853 | A1 | 8/2012 | Abershitz et al. | |
| 2016/0048129 | A1 | 2/2016 | Kolanek et al. | |
| 2018/0362157 | A1 | 12/2018 | Teetzel | |
| 2018/0372460 | A1 * | 12/2018 | Loehken | F42B 1/032 |

* cited by examiner

PROJECTILE ON TARGET
NO POINTING
CORRECTION NEEDED

PROJECTILE OVERSHOOT
POINTING
CORRECTION NEEDED

1002

1006B
1002
1006V 34B
34B
1002
1002E
1002D
L12

PROJECTILE DELIVERY SYSTEMS AND WEAPONIZED AERIAL VEHICLES AND METHODS INCLUDING SAME

RELATED APPLICATIONS

The present application is a continuation-in-part of U.S. patent application Ser. No. 18/314,961, filed May 10, 2023, which is a continuation of and claims priority from U.S. patent application Ser. No. 17/544,305, filed Dec. 7, 2021, which claims the benefit of and priority from U.S. Provisional Ser. No. 63/127,703, filed Dec. 18, 2020, the disclosures of which are incorporated herein by reference in their entireties.

FIELD

The present invention relates to weapons and, more particularly, to weapons deployed from aerial vehicles and weaponized aerial vehicles including same.

BACKGROUND

Aerial vehicles are commonly used to deploy weapons such as bombs and rockets against targets.

SUMMARY OF THE INVENTION

According to some embodiments, a projectile delivery module for use with an aerial vehicle includes a projectile delivery system including a kinetic projectile and a base system. The kinetic projectile includes a projectile body, an onboard steering system, and a radio-frequency (RF) receiver. The onboard steering system includes: a steering mechanism operable to change an attitude, orientation, and/or direction of flight of the kinetic projectile; and a steering actuator operable to control the steering mechanism. The base system includes: an RF transmitter to communicate with the RF receiver of the kinetic projectile; a projectile holder configured to secure the kinetic projectile to the aerial vehicle and configured to selectively release the kinetic projectile; a target tracking system; and a projectile guidance system including a projectile tracking system and a projectile control system. The projectile delivery module is configured to be mounted on the aerial vehicle for flight therewith. The base system is configured to: release the kinetic projectile from the projectile holder such that the kinetic projectile is driven toward a target by gravity; track the target using the target tracking system; track the released kinetic projectile using the projectile tracking system; and automatically control the onboard steering system of the kinetic projectile using the projectile control system to adjust a trajectory of the falling kinetic projectile to steer the kinetic projectile to the target.

According to some embodiments, the kinetic projectile does not include or carry explosive material or incendiary material.

According to some embodiments, the released kinetic projectile is driven downward only by gravity.

According to some embodiments, the kinetic projectile does not include or carry an onboard propulsion mechanism.

According to some embodiments, the kinetic projectile does not include or carry an onboard target tracking system.

According to some embodiments, the kinetic projectile does not include or carry an onboard projectile guidance system.

According to some embodiments, the kinetic projectile does not include or carry a GPS signal receiver.

In some embodiments, the kinetic projectile delivery system includes a plurality of the kinetic projectiles.

In some embodiments, the base system is operable to release a plurality of the kinetic projectiles in a salvo directed at the target.

According to some embodiments, the projectile body is elongate.

In some embodiments, the projectile body has a length: width ratio in the range of from about 8 to 15.

In some embodiments, the projectile body has a length in the range of from about 10 to 16 inches long, and a mass in the range of from about 70 to 350 grams without a payload.

In some embodiments, the projectile body has a leading end that is tapered to pierce the target.

According to some embodiments, the projectile body includes a polymeric component and a metal nose.

According to some embodiments, the projectile steering mechanism includes an adjustable aerodynamic control surface.

In some embodiments, the adjustable aerodynamic control surface is a movable fin or canard.

In some embodiments, the projectile steering actuator includes a motor operable to move the aerodynamic control surface.

According to some embodiments, the kinetic projectile includes a self-designation feature, and the projectile tracking system uses the self-designation feature to track the released projectile in flight.

In some embodiments, the self-designation feature is an infrared light emitter, a blue light (400 to 480 nm) emitter, or a UV (240 to 400 nm) emitter.

According to some embodiments, the projectile delivery system controls the flight of the released projectile using one-way communication between the base system and the kinetic projectile, wherein: the base system sends steering commands to the kinetic projectile; and the kinetic projectile does not send signals to the base system.

According to some embodiments, the projectile delivery system controls the flight of the released projectile using two-way communication between the base system and the kinetic projectile, wherein: the base system sends steering commands to the kinetic projectile; and the kinetic projectile sends projectile status data to the base system to incorporate into projectile tracking and guidance processing by the base system.

In some embodiments, the projectile status data includes at least one of: a magnetometer-based heading reading; an airspeed of the projectile; an altitude of the projectile; an attitude of the kinetic projectile; an orientation of the kinetic projectile; and a rate of rotation of the kinetic projectile about each of a roll axis, a pitch axis, and a yaw axis.

In some embodiments, the kinetic projectile includes an onboard projectile state sensor that acquires the projectile status data instantaneously.

According to some embodiments, the weaponized aerial vehicle is configured such that: the aerial vehicle is automatically placed in a tracking/guidance mode when the kinetic projectile is released and in flight; and in the tracking/guidance mode, flight of the aerial vehicle is controlled to optimize guidance of the kinetic projectile.

In some embodiments, the projectile tracking system includes a camera to track the inflight projectile, and the camera is secured to the aerial vehicle without a gimbal when the projectile delivery module is mounted on the aerial vehicle.

In some embodiments, the kinetic projectile includes an environmental sensor on the projectile body.

The environmental sensor may include at least one of a microphone and a camera.

According to some embodiments, the projectile delivery system is configured to: receive a target designation from an operator; and thereafter automatically execute the tracking of the target and the tracking and guidance of the kinetic projectile using the base system onboard the aerial vehicle.

According to some embodiments, the projectile delivery system is configured to: receive a target designation from an operator; receive a designation of an abort zone from the operator; and guide the released kinetic projectile to the abort zone in response to a command to abort the attack.

According to some embodiments, the projectile delivery system is configured to: receive a target designation from an operator; receive a designation of a keep out zone from the operator; and prevent the kinetic projectile from landing in the keep out zone.

According to some embodiments, the base system includes a camera to be mounted on the aerial vehicle, and the target tracking system is configured to: acquire image data from the camera; and track the target using computer vision.

In some embodiments, the projectile guidance system is configured to: receive a bounding box designation from an operator; and control the onboard steering system of the kinetic projectile to adjust a trajectory of the falling projectile to steer the kinetic projectile into a space designated by the bounding box.

In some embodiments, the base system is configured to communicate with a remote operator terminal to report projectile tracking data relative to a location of the target and/or a designated zone.

In some embodiments, the base system is configured to communicate with a remote operator terminal to report projectile tracking data relative to a location of the target and relative to at least one of a designated abort zone and a designated keep out zone.

According to some embodiments, the kinetic projectile includes an energetic payload.

According to some embodiments, a weaponized aerial vehicle includes an aerial vehicle and a projectile delivery system mounted on the aerial vehicle for flight therewith. The projectile delivery system includes a kinetic projectile and a base system. The kinetic projectile includes a projectile body and an onboard steering system. The onboard steering system includes: a steering mechanism operable to change an attitude, orientation, and/or direction of flight of the kinetic projectile; and a steering actuator operable to control the steering mechanism. The base system includes: a projectile holder securing the kinetic projectile to the aerial vehicle and configured to selectively release the kinetic projectile; a target tracking system; and a projectile guidance system including a projectile tracking system and a projectile control system. The base system is configured to: release the kinetic projectile from the projectile holder such that the kinetic projectile is driven toward a target by gravity; track the target using the target tracking system; track the released kinetic projectile using the projectile tracking system; and automatically control the onboard steering system of the kinetic projectile using the projectile control system to adjust a trajectory of the falling kinetic projectile to steer the kinetic projectile to the target.

According to some method embodiments, a method for damaging a target includes providing a weaponized aerial vehicle including an aerial vehicle and a projectile delivery system mounted on the aerial vehicle for flight therewith. The projectile delivery system includes a kinetic projectile and a base system. The kinetic projectile includes a projectile body and an onboard steering system. The onboard steering system includes: a steering mechanism operable to change an attitude, orientation, and/or direction of flight of the kinetic projectile; and a steering actuator operable to control the steering mechanism. The base system includes: a projectile holder securing the kinetic projectile to the aerial vehicle and configured to selectively release the kinetic projectile; a target tracking system; and a projectile guidance system including a projectile tracking system and a projectile control system. The method further includes using the base system to: release the kinetic projectile from the projectile holder such that the kinetic projectile is driven toward a target by gravity; track the target using the target tracking system; track the released kinetic projectile using the projectile tracking system; and automatically control the onboard steering system of the kinetic projectile using the projectile control system to adjust a trajectory of the falling kinetic projectile to steer the kinetic projectile to the target.

According to some method embodiments, a method for sensing an environmental condition includes providing a sensor-equipped aerial vehicle including an aerial vehicle and a projectile delivery system mounted on the aerial vehicle for flight therewith. The projectile delivery system includes a projectile and a base system. The projectile includes a projectile body, an onboard steering system, and an onboard environmental sensor. The onboard steering system includes: a steering mechanism operable to change an attitude, orientation, and/or direction of flight of the kinetic projectile; and a steering actuator operable to control the steering mechanism. The base system includes: a projectile holder securing the projectile to the aerial vehicle and configured to selectively release the projectile; a target location tracking system; and a projectile guidance system including a projectile tracking system and a projectile control system. The method further includes using the base system to: release the projectile from the projectile holder such that the projectile is driven toward a target location by gravity; track the target location using the target tracking system; track the released projectile using the projectile tracking system; and automatically control the onboard steering system of the projectile using the projectile control system to adjust a trajectory of the falling projectile to steer the projectile to the target location. The method further includes using the onboard environmental sensor to sense an environmental condition at the target location.

In some embodiments, the method includes: recording, on the projectile, data acquired from the environmental sensor at the target location; and/or transmitting, from the projectile, data acquired from the environmental sensor at the target location.

According to some embodiments, a weaponized aerial vehicle includes an aerial vehicle and a projectile delivery system mounted on the aerial vehicle for flight therewith. The projectile delivery system includes a projectile and a base system. The projectile includes a projectile body, an onboard steering system, and an energetic payload. The onboard steering system includes: a steering mechanism operable to change an attitude, orientation, and/or direction of flight of the projectile; and a steering actuator operable to control the steering mechanism. The base system includes: a projectile holder securing the projectile to the aerial vehicle and configured to selectively release the projectile; a target tracking system; and a projectile guidance system including a projectile tracking system and a projectile control system. The base system is configured to: release the projectile from the projectile holder such that the projectile is driven toward a target by gravity; track the target using the target tracking system; track the released projectile using the projectile tracking system; and automatically control the onboard steering system of the projectile using the projectile control system to adjust a trajectory of the falling projectile to steer the projectile to the target.

In some embodiments, the energetic payload is a high explosive.

In some embodiments, the energetic payload is a combustible material, and the projectile is configured to ignite the combustible material to generate a flash-bang effect.

In some embodiments, the energetic payload is an incendiary material, and the projectile is configured to ignite the incendiary material to generate a pyrophoric reaction.

In some embodiments, the energetic payload is a high explosive, the projectile includes a fragment projection warhead including a fragmentation case or preformed fragments, and the high explosive is configured to forcibly project fragments from the fragment projection warhead when the high explosive is detonated.

According to some embodiments, the energetic payload is a high explosive, and the projectile includes a shaped charge including the high explosive and a shaped charge liner.

In some embodiments, the projectile further includes a fragmentation case or preformed fragments, and the high explosive is configured to forcibly project fragments from the fragment projection warhead when the high explosive is detonated.

In some embodiments, the projectile further includes a frangible case containing the high explosive, and the high explosive is configured to break the frangible case without generating lethal fragments when the high explosive is detonated.

In some embodiments, the weaponized aerial vehicle includes a frangible nose cover mounted in front of the shaped charge.

According to some embodiments, the shaped charge is a shaped charge jet (SCJ) and the shaped charge liner is an SCJ liner.

In some embodiments, the SCJ liner is generally conical.

In some embodiments, the SCJ liner has a flat end wall at its vertex.

In some embodiments, the SCJ liner has a hemispherical end wall at its vertex.

In some embodiments, the SCJ liner includes a sidewall having a tapered thickness.

In some embodiments, the SCJ liner includes a cylindrical extension wall extending forwardly from the base of the cone.

In some embodiments, the SCJ liner is generally hemispherical.

In some embodiments, the shaped charge is an explosive formed penetrator (EFP) and the shaped charge liner is an EFP liner.

According to some embodiments, the projectile is configured to detonate the high explosive to fire the shaped charge when the projectile is at a stand-off distance from the target within a prescribed stand-off distance range.

In some embodiments, the projectile includes a target proximity sensor configured to detect a distance between the projectile and the target, and a fuze system operative to detonate the high explosive to fire the shaped charge based on data from the target proximity sensor.

In some embodiments, the prescribed stand-off distance range is in the range of from about 15 cm to 60 cm.

According to some embodiments, the projectile includes an onboard projectile stabilization system, and an onboard target sensor, and the onboard projectile stabilization system is operative to automatically control the onboard steering system to correct an orientation of the projectile with respect to the target as the projectile approaches the target.

In some embodiments, the projectile is configured to detonate the energetic payload after the projectile penetrates the target.

In some embodiments, the released projectile is driven downward only by gravity.

In some embodiments, the projectile does not include or carry an onboard propulsion mechanism.

In some embodiments, the projectile does not include or carry an onboard target tracking system.

In some embodiments, the projectile does not include or carry an onboard projectile guidance system.

In some embodiments, the projectile does not include or carry a GPS signal receiver.

In some embodiments, the projectile delivery system includes a plurality of the projectiles.

In some embodiments, the base system is operable to release a plurality of the projectiles in a salvo directed at the target.

According to some embodiments, the projectile body is elongate.

In some embodiments, the projectile body has a length: width ratio in the range of from about 8 to 15.

In some embodiments, the projectile body has a length in the range of from about 10 to 16 inches long, and a mass in the range of from about 70 to 350 grams without a payload.

In some embodiments, the projectile body has a leading end that is tapered to pierce the target.

According to some embodiments, the projectile body includes a polymeric component and a metal nose.

According to some embodiments, the projectile steering mechanism includes an adjustable aerodynamic control surface.

In some embodiments, the adjustable aerodynamic control surface is a movable fin or canard.

In some embodiments, the projectile steering actuator includes a motor operable to move the aerodynamic control surface.

According to some embodiments, the projectile includes a self-designation feature, and the projectile tracking system uses the self-designation feature to track the released projectile in flight.

In some embodiments, the self-designation feature is an infrared light emitter, a blue light (400 to 480 nm) emitter, or a UV (240 to 400 nm) emitter.

According to some embodiments, the projectile delivery system controls the flight of the released projectile using one-way communication between the base system and the projectile, wherein: the base system sends steering commands to the projectile; and the projectile does not send signals to the base system.

According to some embodiments, the projectile delivery system controls the flight of the released projectile using two-way communication between the base system and the projectile, wherein: the base system sends steering commands to the projectile; and the projectile sends projectile status data to the base system to incorporate into projectile tracking and guidance processing by the base system.

In some embodiments, the projectile status data includes at least one of: a magnetometer-based heading reading; an airspeed of the projectile; an altitude of the projectile; an attitude of the projectile; an orientation of the projectile; and a rate of rotation of the projectile about each of a roll axis, a pitch axis, and a yaw axis.

In some embodiments, the projectile includes an onboard projectile state sensor that acquires the projectile status data instantaneously.

According to some embodiments, the weaponized aerial vehicle is configured such that: the aerial vehicle is automatically placed in a tracking/guidance mode when the projectile is released and in flight; and in the tracking/guidance mode, flight of the aerial vehicle is controlled to optimize guidance of the projectile.

In some embodiments, the projectile tracking system includes a camera to track the inflight projectile, and the camera is secured to the aerial vehicle without a gimbal.

According to some embodiments, the projectile delivery system is configured to: receive a target designation from an operator; and thereafter automatically execute the tracking of the target and the tracking and guidance of the projectile using the base system onboard the aerial vehicle.

According to some embodiments, the projectile delivery system is configured to: receive a target designation from an operator; receive a designation of an abort zone from the operator; and guide the released projectile to the abort zone in response to a command to abort the attack.

According to some embodiments, the projectile delivery system is configured to: receive a target designation from an operator; receive a designation of a keep out zone from the operator; and prevent the projectile from landing in the keep out zone.

According to some embodiments, the base system includes a camera to be mounted on the aerial vehicle, and the target tracking system is configured to: acquire image data from the camera; and track the target using computer vision.

In some embodiments, the projectile guidance system is configured to: receive a bounding box designation from an operator; and control the onboard steering system of the projectile to adjust a trajectory of the falling projectile to steer the projectile into a space designated by the bounding box.

According to some embodiments, the base system is configured to communicate with a remote operator terminal to report projectile tracking data relative to a location of the target and/or a designated zone.

In some embodiments, the base system is configured to communicate with a remote operator terminal to report projectile tracking data relative to a location of the target and relative to at least one of a designated abort zone and a designated keep out zone.

According to some embodiments, a method for damaging a target includes providing a weaponized aerial vehicle including an aerial vehicle and a projectile delivery system mounted on the aerial vehicle for flight therewith. The projectile delivery system includes a projectile and a base system. The projectile includes a projectile body, an onboard steering system, and an energetic payload. The onboard steering system includes: a steering mechanism operable to change an attitude, orientation, and/or direction of flight of the projectile; and a steering actuator operable to control the steering mechanism. The base system includes: a projectile holder securing the projectile to the aerial vehicle and configured to selectively release the projectile; a target tracking system; and a projectile guidance system including a projectile tracking system and a projectile control system. The method further includes using the base system to: release the projectile from the projectile holder such that the projectile is driven toward a target by gravity; track the target using the target tracking system; track the released projectile using the projectile tracking system; and automatically control the onboard steering system of the projectile using the projectile control system to adjust a trajectory of the falling projectile to steer the projectile to the target.

According to some embodiments, a weaponized aerial vehicle system includes an aerial vehicle, a projectile releasably mounted on the aerial vehicle for flight therewith, and a guidance system. The projectile includes a projectile body, an onboard steering system, an onboard projectile stabilization system; and an onboard target proximity sensor. The onboard steering system includes: a steering mechanism operable to change an attitude, orientation, and/or direction of flight of the projectile; and a steering actuator operable to control the steering mechanism. The guidance station includes a projectile control system. The projectile is releasably from the aerial vehicle such that the projectile is driven toward a target by gravity. The guidance station is configured to remotely automatically control the onboard steering system of the projectile using the projectile control system to adjust a trajectory of the falling projectile to steer the projectile to the target. The onboard projectile stabilization system is operative, using sensor input from the target proximity sensor, to automatically control the onboard steering system to correct an orientation of the projectile with respect to the target as the projectile approaches the target.

According to some embodiments, the projectile includes a shaped jet charge (SCJ) configured to generate an SCJ stream, and the onboard projectile stabilization system is operative to automatically control the onboard steering system to correct an orientation of the projectile with respect to the target as the projectile approaches the target by: using the sensor input from the target proximity sensor, estimating a target location relative to the projectile; and using the onboard steering system, rotating the projectile so that the SCJ stream is directed at the target.

According to some embodiments, a method for damaging a target includes providing a projectile releasably mounted on an aerial vehicle for flight with the aerial vehicle. The projectile includes a projectile body, an onboard steering system, an onboard projectile stabilization system, and an onboard target proximity sensor. The onboard steering system includes: a steering mechanism operable to change an attitude, orientation, and/or direction of flight of the projectile; and a steering actuator operable to control the steering mechanism. The method further includes: providing a guidance station including a projectile control system; releasing the projectile from the aerial vehicle such that the projectile is driven toward the target by gravity; using the guidance station, remotely automatically controlling the onboard steering system of the projectile using the projectile control system to adjust a trajectory of the falling projectile to steer the projectile to the target; and using the onboard projectile stabilization system, automatically controlling the onboard steering system to correct an orientation of the projectile with respect to the target as the projectile approaches the target.

DESCRIPTION

Figure 1:
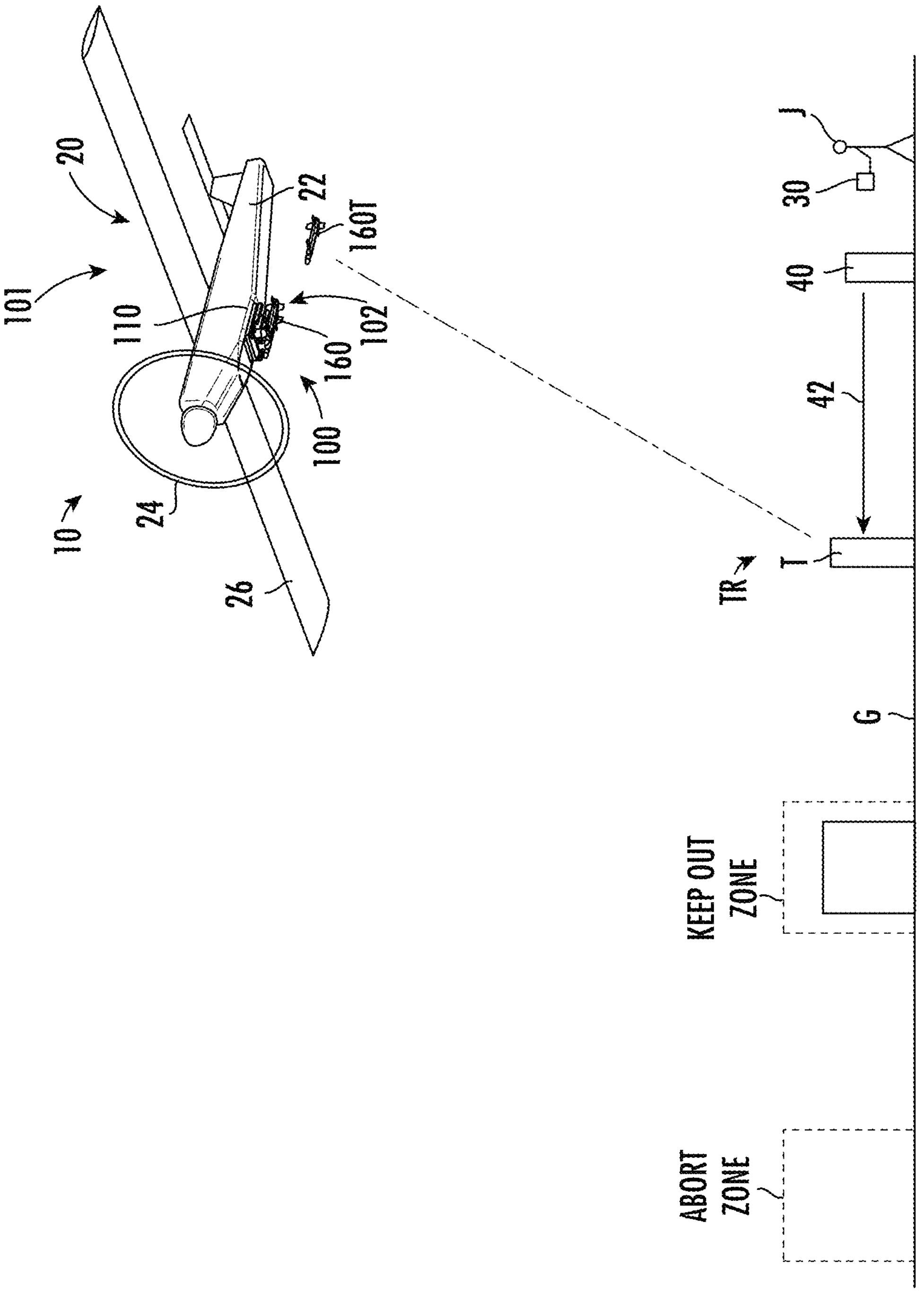
FIG. 1 is a schematic view of a weapon system according to some embodiments along with a target and an operator, wherein the weapon system includes a weaponized aerial vehicle, and wherein the weaponized aerial vehicle includes an aerial vehicle and a projectile delivery module according to some embodiments of the invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

As used herein the expression "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, "monolithic" means an object that is a single, unitary piece formed or composed of a material without joints or seams.

The term "automatically" means that the operation is substantially, and may be entirely, carried out without human or manual input, and can be programmatically directed or carried out.

The term "programmatically" refers to operations directed and/or primarily carried out electronically by computer program modules, code and/or instructions.

The term "electronically" includes both wireless and wired connections between components.

With reference to FIGS. 1-10, a weapon system 10 (FIG. 1) according to some embodiments is shown therein. The weapon system 10 includes a projectile delivery system 100 according to some embodiments, the weapon system 10 includes an aerial vehicle 20 as a launch platform. The projectile delivery system 100 is mounted on the aerial vehicle 20 for flight therewith. The projectile delivery system 100 and the aerial vehicle 20 together form a weaponized aerial vehicle 101. The projectile delivery system 100 includes a base system 110 and a plurality of kinetic projectiles 160 mounted on the base system 110. In use, the system 10 and weaponized aerial vehicle 101 are operated to attack and inflict damage on a target T below the weaponized aerial vehicle 101 on or proximate the ground G. More particularly, the projectile delivery system 100 is operated to drop and guide one or more of the projectiles 160 onto the target T. Each projectile 160 can thus serve as a gravity-driven, guided kinetic kill projectile and, in particular, may be a precision-guided kinetic kill projectile. The target T may be ground-based. The target may include one or more personnel and/or materiel.

In some embodiments, the weapon system 10 also includes a remote control station 30 that may be used by an operator J to monitor and/or control some operation of the projectile delivery system 100. In some embodiments, the target T is selected by a human operator (hereinafter, "the operator") and tracked by computer vision executed on the base system 110.

In some embodiments, the weapon system 10 also includes a designation laser source 40 operable to generate a laser beam 42 onto or proximate the target T to assist in guiding the projectile(s) 160, as discussed below.

In some embodiments, the aerial vehicle 20 is an unmanned aerial vehicle (UAV) and the aerial vehicle 101 is a weaponized unmanned aerial vehicle. However, in other embodiments, the aerial vehicle may be manned aerial vehicle. In some embodiments, the weaponized aerial vehicle 101 is relatively small (e.g., less than two meters in the largest plan dimension) so that the weaponized aerial vehicle 101 is difficult to detect below a cloud deck. In some embodiments, when deploying projectile delivery system 100 the weaponized aerial vehicle may reduce the speed of its engines/motors, or may stop its engines/motors entirely, to avoid audible detection below the cloud deck.

The illustrated aerial vehicle 20 (FIGS. 1-4) includes a body or chassis 22, a propulsion system 24 (e.g., a motor driven rotor), wings 26, and an onboard power supply (e.g., battery). However, it will be appreciated that any suitable aerial vehicle may be used.

Figure 2:
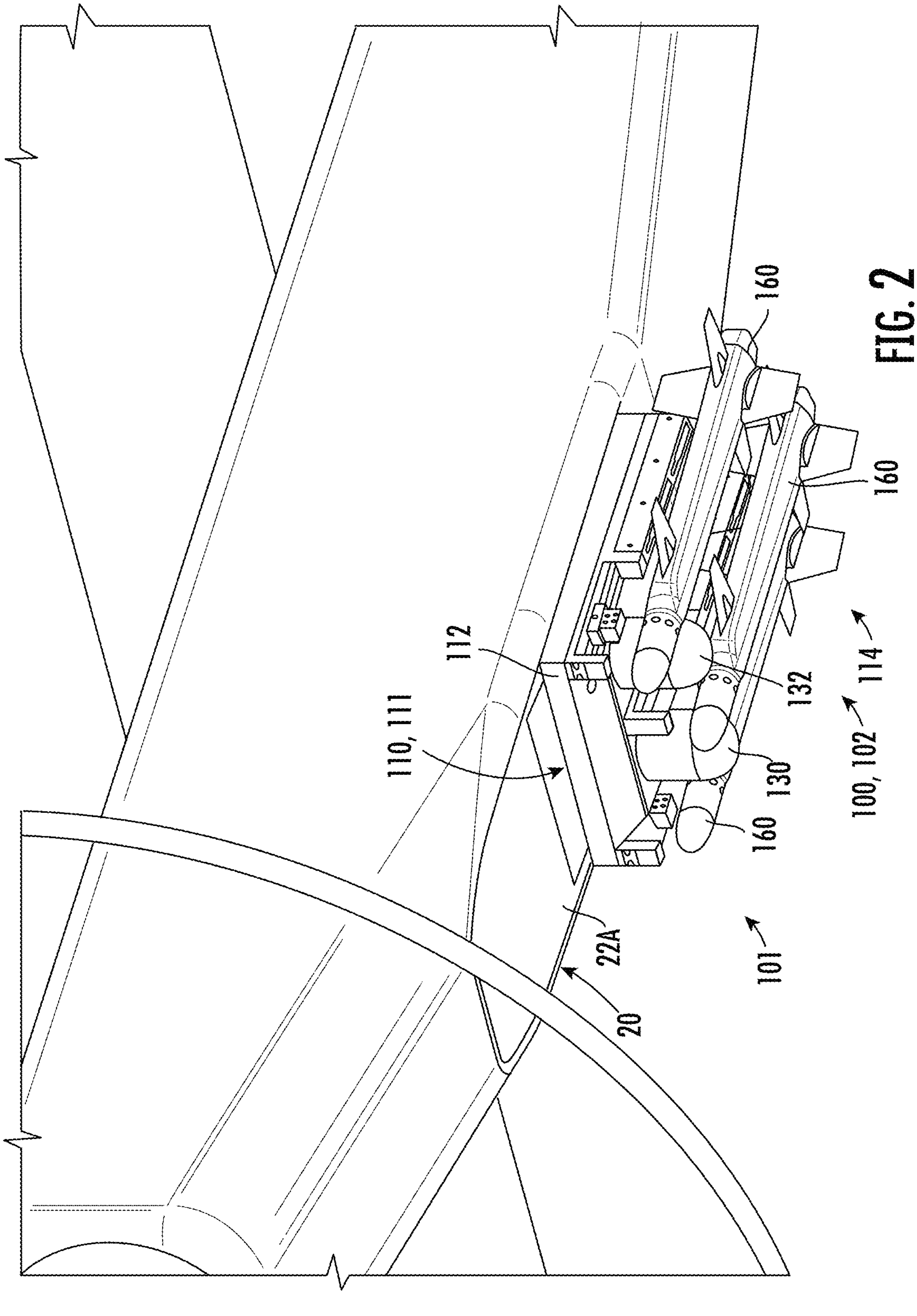
FIG. 2 is an enlarged, fragmentary, bottom perspective view of the weaponized aerial vehicle of FIG. 1.
Figure 3:
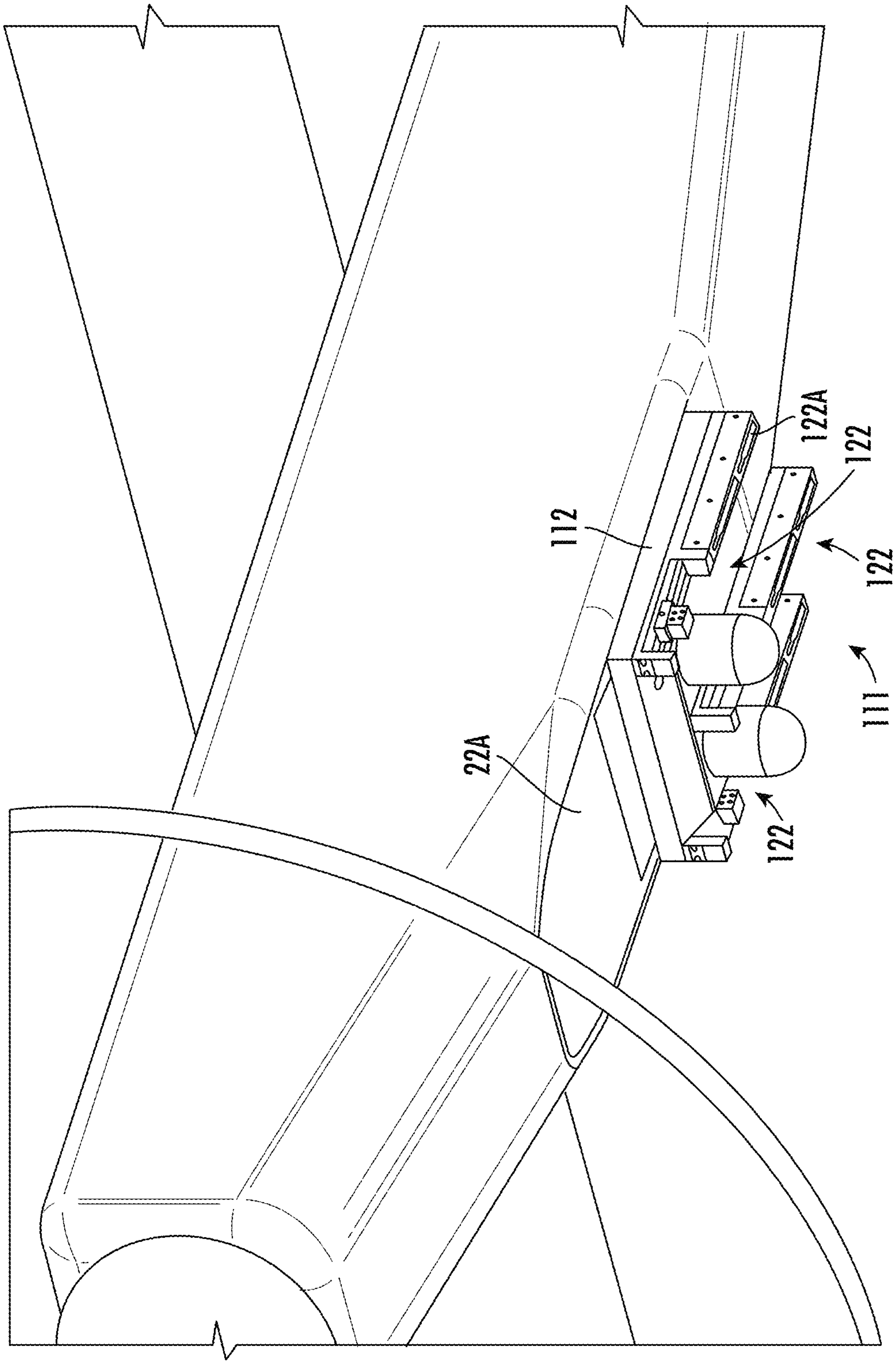
FIG. 3 is an enlarged, fragmentary, bottom perspective view of the weaponized aerial vehicle of FIG. 1, wherein the projectile delivery module is shown without kinetic projectiles forming a part thereof.
Figure 4:
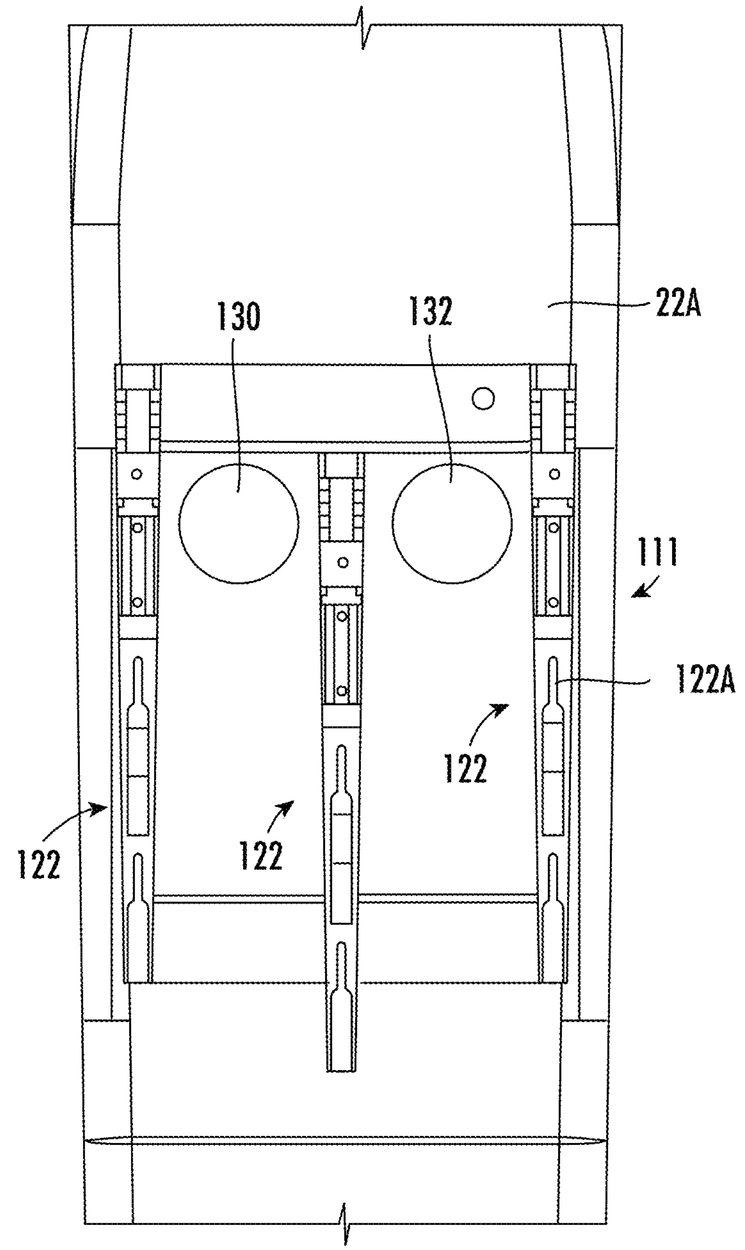
FIG. 4 is an enlarged, fragmentary, bottom plan view of the weaponized aerial vehicle of FIG. 1, wherein the projectile delivery module is shown without the kinetic projectiles.
Figure 5:
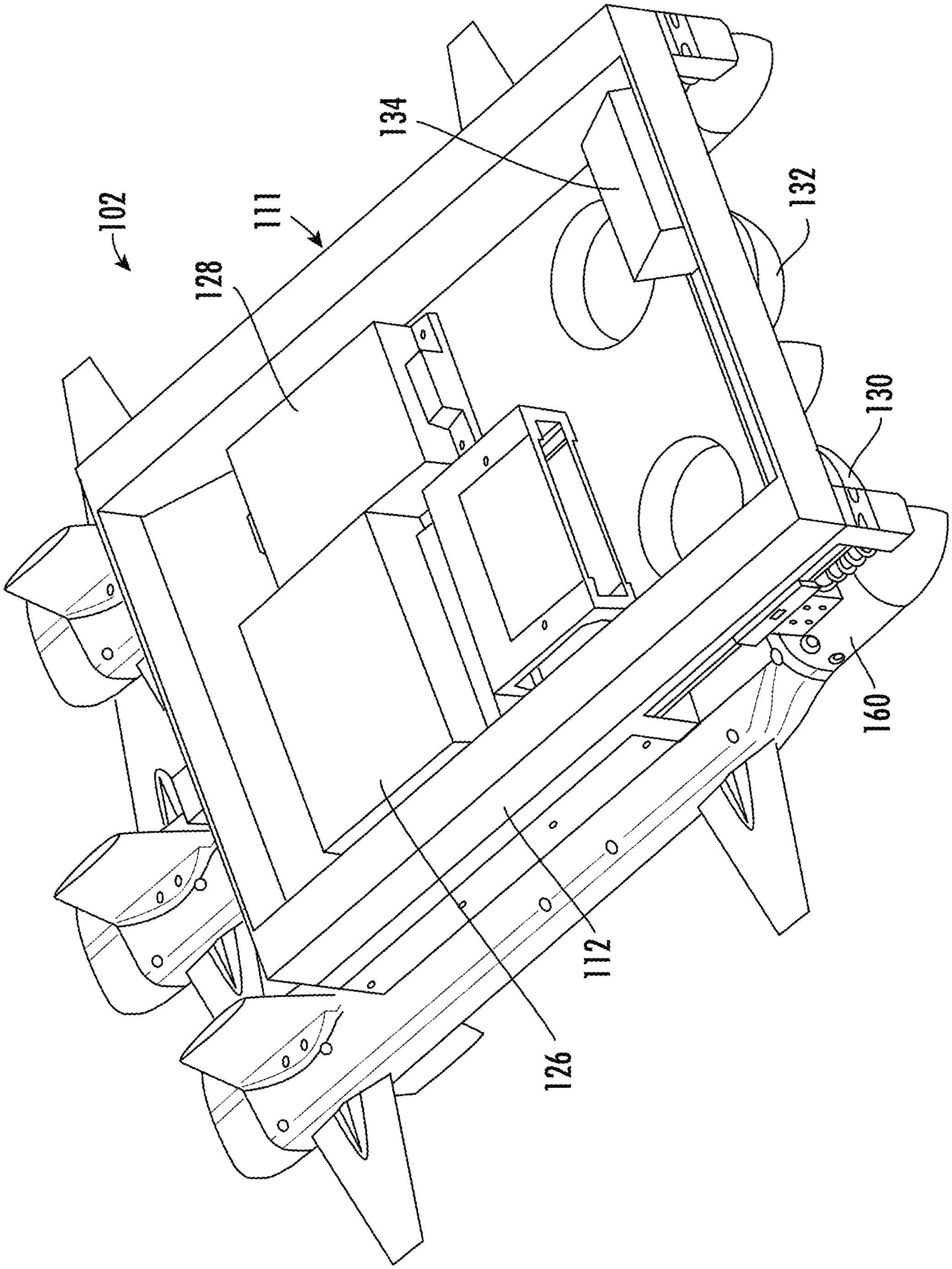
FIG. 5 is a top perspective view of the projectile delivery module of FIG. 1.
Figure 6:
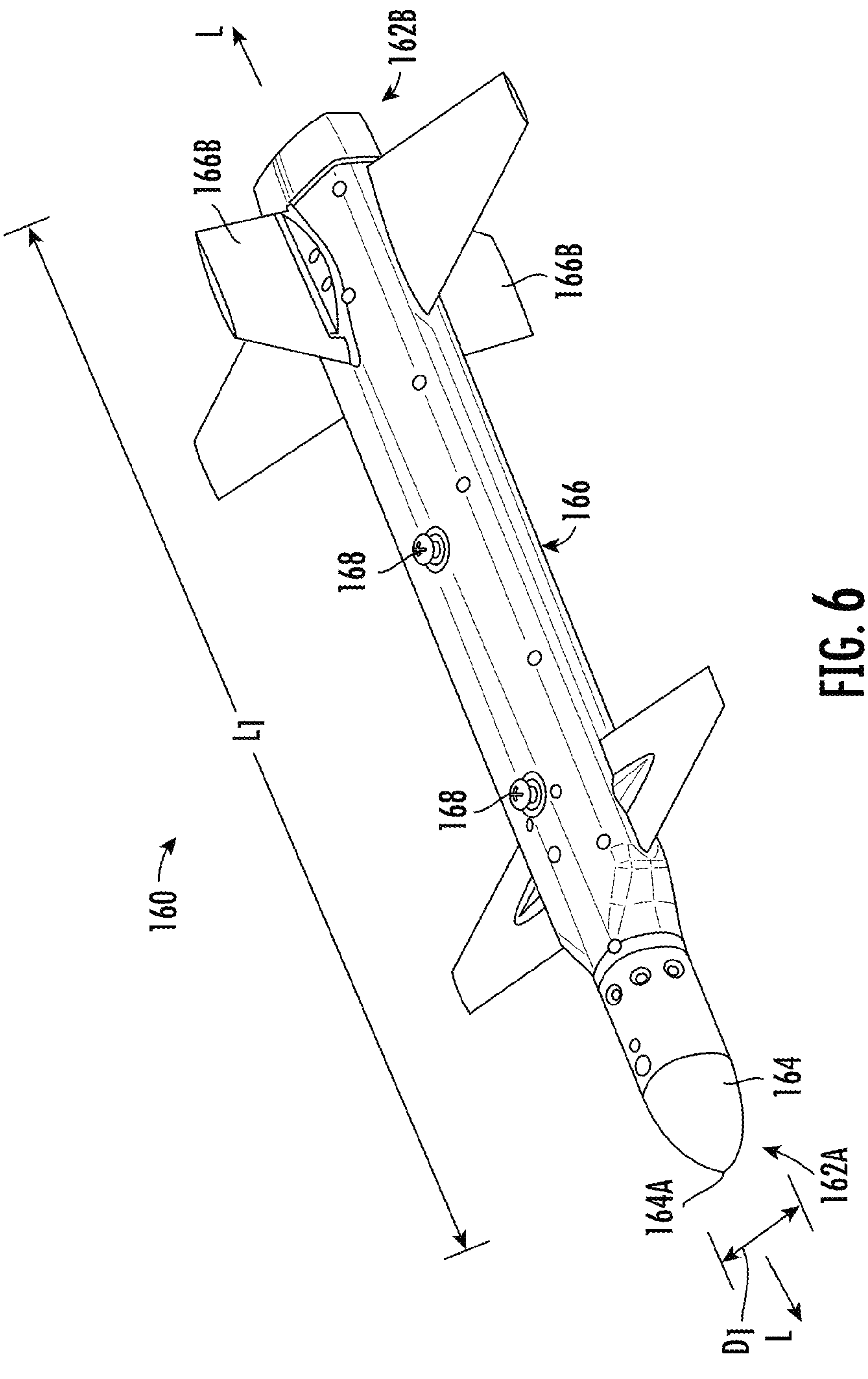
FIG. 6 is a top perspective view of one of the kinetic projectiles forming a part of the projectile delivery module of FIG. 1.
Figure 7:
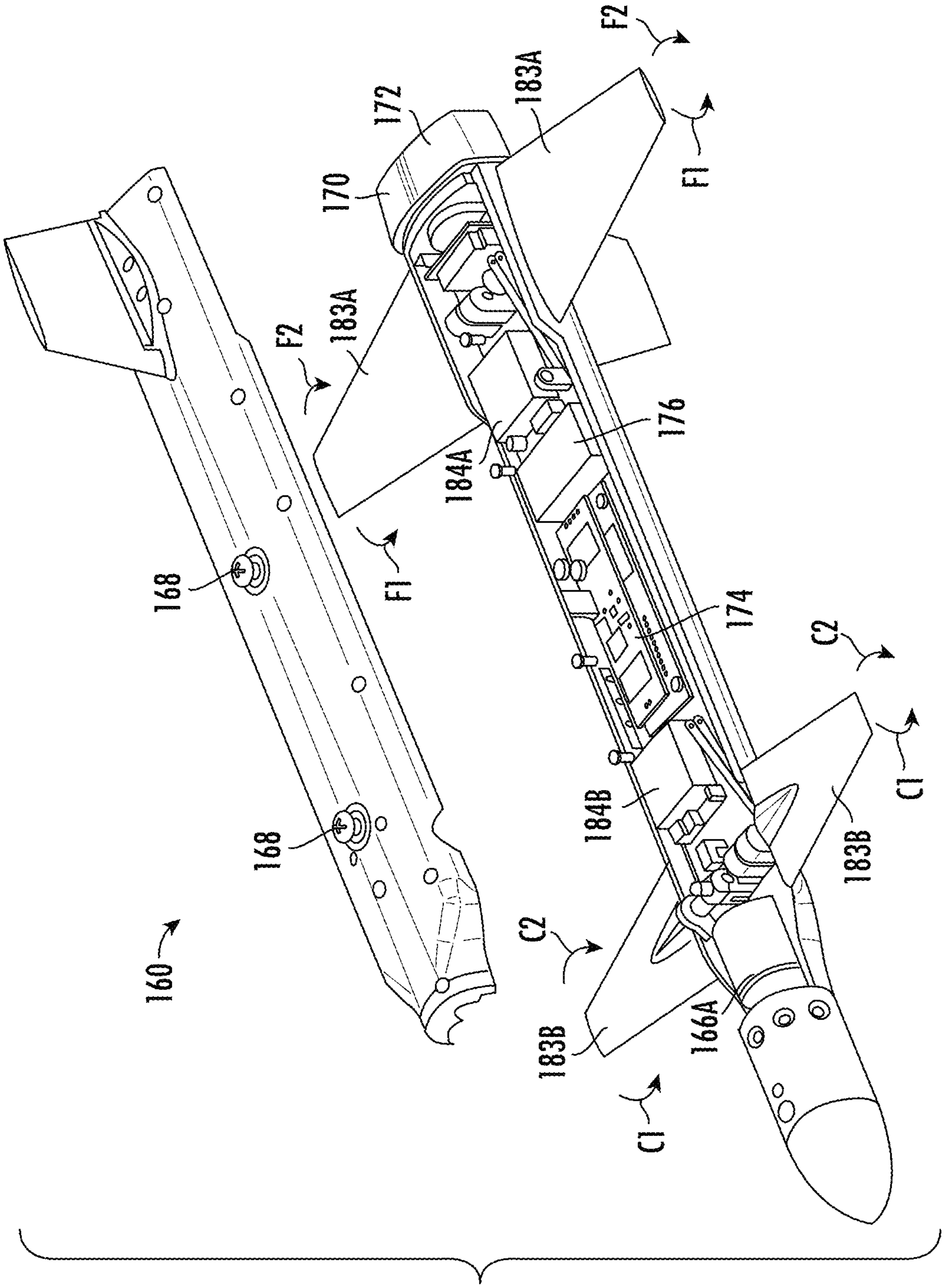
FIG. 7 is an exploded, top perspective view of the kinetic projectile of FIG. 6.

The projectile delivery system 100 is embodied in a projectile delivery module 102 (FIG. 2) mounted on the aerial vehicle 20. With reference to FIG. 2, the projectile delivery module 102 includes a base module 111, (secured to the belly 22A of the aerial vehicle 20), and the projectiles 160 secured to the base module 111. In some embodiments, all the components of the base system 110 are embodied in the base module 111. The projectile delivery module 102 may take the form of pod or assembly that can be readily integrated with a chosen aerial vehicle as launch platform.

The base system 110 includes a frame or housing 112, a plurality of projectile holders 120, and an operational control system 114.

Each projectile holder 120 includes a slot or seat 122 (FIGS. 3 and 4) configured to releasably receive or hold one of the kinetic projectiles 160.

Figure 8:
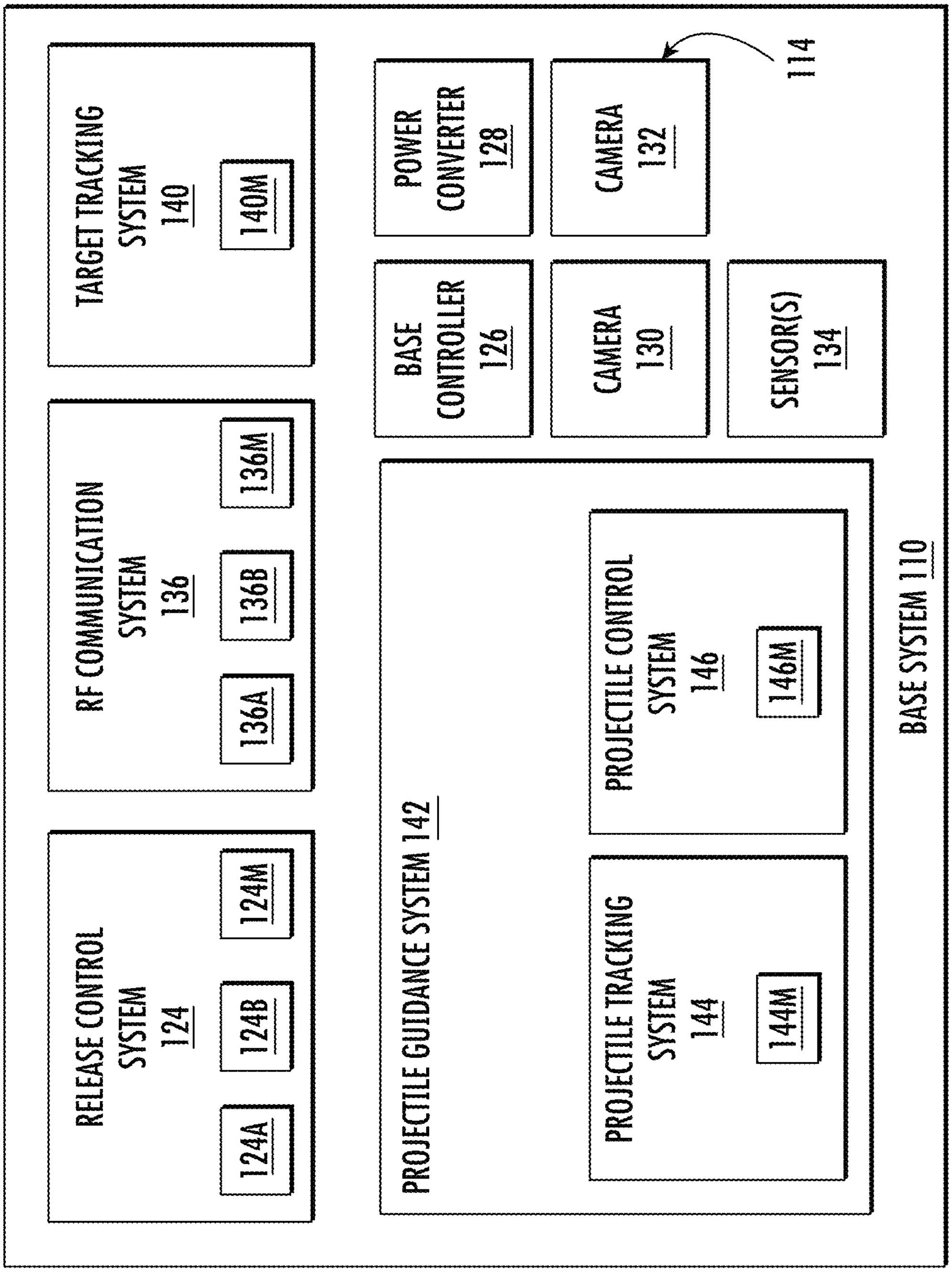
FIG. 8 is a schematic view representing a base system forming a part of the projectile delivery module of FIG. 1.
Figure 9:
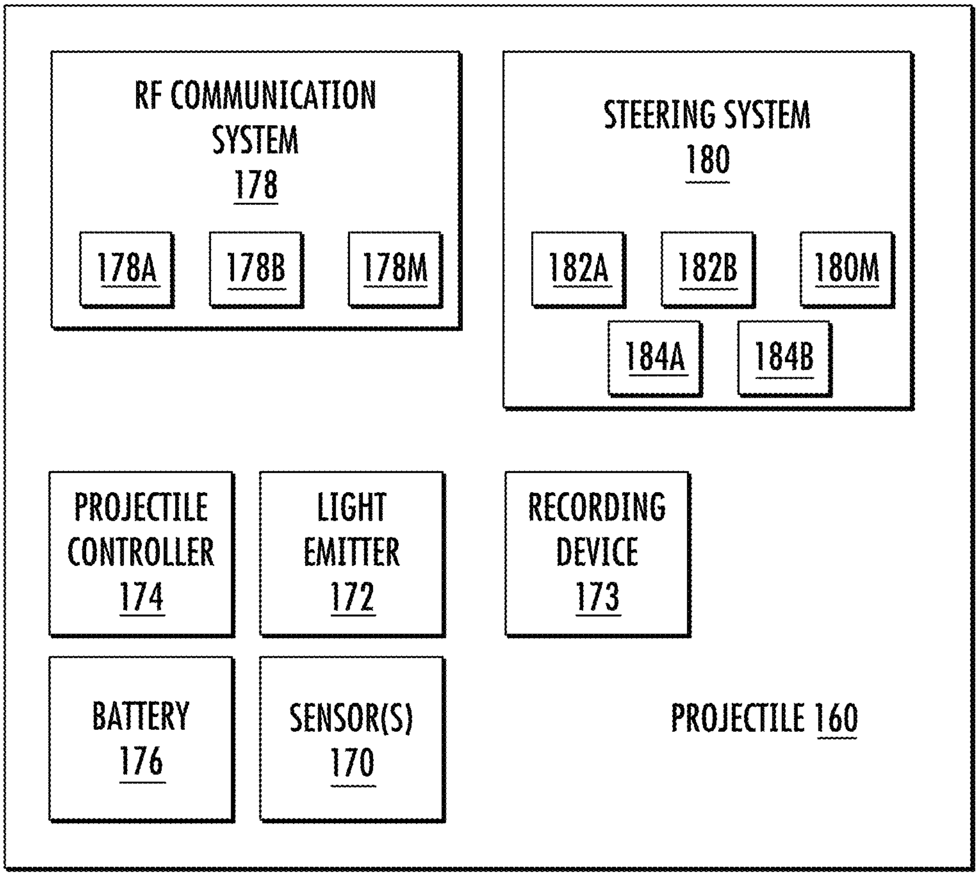
FIG. 9 is a schematic view representing one of the kinetic projectiles forming a part of the projectile delivery module of FIG. 1.

FIG. 8 is a schematic representation of the operational control system 114. The operational control system 114 includes a base controller 126, a power converter 128, a first camera 130, a second camera 132, one or more environmental sensors 134, a projectile release control system 124, a radio-frequency (RF) communication system 136, a target tracking system 140, and a projectile guidance system 142.

The base controller 126 may be any suitable device or processor, such as a microprocessor-based computing device. The functionality of the base controller 126 may be distributed across or embodied in one or more controllers forming a part of the base module 111. The modules 124M, 136M, 140M, 144M, and 146M discussed below are computer program code modules that may be embodied in software and/or firmware as discussed below. The modules 124M, 136M, 140M, 144M, and 146M may be embodied in the base controller 126, for example.

The onboard power converter 128 may be electrically connected to the aerial vehicle 20 to supply operational power from the aerial vehicle to the base system 110. In some embodiments, the base module 111 may include an onboard battery in addition to or in place of the power supply from the aerial vehicle 20.

The cameras 130, 132 may be any suitable cameras for executing the functions described herein. In some embodiments, the camera 130 is a wide-field camera and the camera 132 is a near-field camera. The cameras 130, 132 may have sensitivity to visible light, infrared (IR), or other light frequencies. In some embodiments, the cameras 130, 132 are compact digital cameras (e.g. FLIR Grasshopper) having electronic sensor elements (e.g. CMOS, CCD) with a pixel count adequate to resolve targets and engagement scenes for the purpose of recognition of features by both the human eye and by computer vision systems. The camera optics may be designed to match the function of a given camera and may have magnification sufficient to deliver appropriate imaging to the camera's sensor elements. The camera may output image information in a range of formats, including video formats (e.g. AVCHD) or a series of individual images (e.g. RAW, TIFF). Camera images are input to processing units on the base controller 126 and may be relayed as necessary to remote users 30.

The environmental sensor(s) 134 may include an inertial sensor, for example.

The projectile release control system 124 includes a release mechanism 124A associated with each seat 122, a release actuator 124B, and a release control module 124M. In use, the release control module 124M signals the release actuator 124B to operate a selected release mechanism 124A to release the corresponding projectile 160 from its seat 122.

The base radiofrequency (RF) communication system 136 includes an RF communication module 136M, an RF radio emitter or transmitter 136A, and an RF radio receiver. In some embodiments, the RF transmitter 136A and the RF transceiver 136B are combined in an RF transceiver.

The target tracking system 140 includes a target tracking module 140M.

The projectile guidance system 142 includes a projectile tracking system 144 and a projectile control system 146. The projectile tracking system 144 includes a projectile tracking module 144M. The projectile control system 146 includes a projectile control module 146M.

In some embodiments, the number of projectiles 160 mounted on the base module 111 in the range of from about 1 to 3 and, in some embodiments, is in the range of from about 8 to 24.

The projectiles 160 (FIGS. 6 and 7) may be constructed substantially the same as one another or differently. In the illustrated embodiment, the projectiles 160 are substantially identical. One of the projectiles 160 will be described hereinbelow, and it will be understood that this description likewise applies to the other projectiles 160.

The projectile 160 has a lengthwise axis L-L, a leading end 162A, and an axially opposed tail end 162B. The projectile 160 includes an axially extending body 166 and a nose section 164. The projectile 160 may be formed in any suitable shape. In some embodiments, the projectile 160 is shaped as an elongate member (e.g., as illustrated). In some embodiments, the nose section 164 is tapered and, in some embodiments is conical. In some embodiments, the leading tip 164A of nose section 125 is pointed or sharp to promote penetration into the target T.

The body 166 and the nose 164 may be formed of any suitable material(s). In some embodiments, the body 166 and the nose 164 are formed of different materials from one another. In some embodiments, the body 166 is formed of a first material such as a polymer, and the nose 164 is formed of a heavier material such as metal. In some embodiments, the projectile also includes a heavy ballast 166A (e.g., metal) in the body 166.

In some embodiments, the length L1 (FIG. 9) of the projectile 160 is in the range of from about 10 to 16 inches.

In some embodiments, the maximum outer diameter D1 (FIG. 9) of the projectile body 166 is in the range of from about 3 cm to 12 cm.

In some embodiments, the ratio of the length L1 to the outer diameter D1 is in the range of from about 8 to 15.

In some embodiments, the mass of the projectile 160 is in the range of from about 70 to 350 grams without a payload.

The projectile 160 may further include stationary fins 166B.

The projectile 160 includes retention features in the form of lugs 168 configured secure the projectile 160 to the base module 111 and cooperate with the base module release mechanism 124A to selectively release the projectile 160 from the base module 111. In the illustrated embodiment, the lugs 168 are received and held in slots 122A (FIGS. 3 and 4) in the corresponding seat 122. In order to effect release of the projectile 160, the actuator 124B operates the release mechanism 124A to drive the projectile 160 rearward, enabling the lugs 168 to drop out of the slots 122A.

The projectile 160 includes (each onboard) one or more sensors 170, one or more self-designation features 172, a projectile controller 174, a battery 176, an RF communication system 178, and an onboard steering system 180. The various components may be mounted in and/or on the body 166 and nose 164 so that the projectile 160 maintains an aerodynamic profile.

The sensor or sensors 170 may include a barometer, a magnetometer, an airspeed sensor, a microphone, a camera, a gyro, an accelerometer, or a photocell (e.g., light sensing), for example.

The self-designation feature 172 may be a light emitter, in some embodiments an infrared light emitter and, in some embodiments an infrared LED. In some embodiments, the self-designation feature(s) 172 includes a blue light emitter (400 to 480 nm wavelength light). In some embodiments, the self-designation feature(s) 172 includes a UV light emitter (240 to 400 nm wavelength light). Each self-designation feature 172 may include a suitable driver.

The projectile controller 174 may be any suitable device or processor, such as a microprocessor-based computing device. The functionality of the projectile controller 174 may be distributed across or embodied in one or more controllers forming a part of the projectile 160. The modules 178M, 180M discussed below are computer program code modules that may be embodied in software and/or firmware as discussed below. The modules 178M, 180M may be embodied in the projectile controller 174, for example.

The projectile RF communication system 178 includes an RF communication module 178M and an RF receiver 178B. In some embodiments, the RF communication system 178 also includes an RF emitter or transmitter 178A. In some embodiments, the projectile 160 does not include an RF transmitter. The RF transmitter 178A and the RF receiver 178B may be combined in an RF transceiver.

The onboard steering system 180 includes a steering module 180M, one or more steering mechanisms including one or more movable aerodynamic control surfaces on the outer surface of the projectile body 166, and one or more the steering actuators operable by the projectile controller 174 and the steering module 180M to selectively move the aerodynamic control surfaces to steer and stabilize the projectile 160 in flight.

In the illustrated embodiment, the onboard steering system 180 includes a first steering mechanism 182A including fins 183A (FIG. 7), and a second steering mechanism 182B including canards 183B. The onboard steering system 180 includes steering actuators 184A operable to selectively articulate or pivot the fins 183A relative to the body in directions F1, F2. The onboard steering system 180 also includes steering actuators 184B operable to selectively articulate or pivot the canards 183B relative to the body in directions C1, C2. In some embodiments, the steering mechanisms 182A, 182B and steering actuators 184A, 184B are configured and operable to rotate each of the four control surfaces 183A, 183B independently of one another. The steering actuators 184A, 184B may be electric motors. Other types and configurations of steering mechanisms may be used.

The remote control station 30 (FIG. 10) may include a human-machine interface 32 including a display 32A and one or more input devices (e.g., a keypad 32B, touch screen 32C, and/or a joy stick 32D). The remote control station 30 includes an RF transceiver 36 and an RF antenna 36A operative to RF transmit and RF receive. In some embodiments, the remote operator station 30 is a portable device.

The weapon system 10 may be used as follows in accordance with some method embodiments. It will be appreciated that certain of the steps and aspects described below and may be modified or omitted as desired and in accordance with other embodiments.

As illustrated in FIG. 1, the weaponized aerial vehicle 20 is flown to a strike position above and in the vicinity of an intended target or targets T (hereinafter, the target region TR). For the purpose of discussion, the description below will describe an implementation wherein only a single target T is to be attacked.

In the strike position, the base system 110 acquires image data of the target region TR. The image data is RF transmitted (i.e., using RF radio signals) to the remote station 30 and displayed on the remote station 30 to the operator. The operator uses the remote station 30 to select and designate the target T. In some embodiments, the weapon system 10 pre-identifies potential targets from the image data and identifies them on the remote station 30 to the operator as target candidates.

Using the remote station 30, the operator instructs the remote station 30 to initiate the attack on the designated target T. This may be accomplished by the act of selecting/designating the target T, or by a subsequent operator input confirming the designation or launching the attack.

In response to the operator attack initiation instruction, the remote station 30 commands (via RF signal communication) the base system 110 to initiate the attack. In response to this command, the release system 124 releases one of the projectiles 160 (indicated in FIG. 1 and hereinafter referred to by the numeral 160T) from the base module 111. More particularly, the release system 124 operates a release actuator 124B to actuate its associated release mechanism 124A to release the kinetic projectile 160T secured thereby. The projectile 160T will then fall under force of gravity toward the earth G.

As the gravity-driven projectile 160T free falls, the target tracking system 140 tracks the position of the target T. More particularly, the base system 110 acquires image data of the target T and target region TR, and the image data is processed by the target tracking module 140M.

Additionally, as the gravity-driven projectile 160T falls, the projectile tracking system 144 of the projectile guidance system 142 tracks the position of the projectile 160T. More particularly, the base system 110 acquires image data of the inflight projectile 160T, and the image data is processed by the projectile tracking system 144.

The projectile control system 146 uses the target tracking data generated by the target tracking system 140 and the projectile tracking data generated by the projectile tracking system 144 to steer the inflight projectile 160T toward the target T and, in some embodiments, stabilize the projectile 160T. More particularly, the projectile control module 146M determines an intended, projected, or planned path of the projectile 160T to the target T, and sends corresponding steering command signals to the projectile 160T that cause the projectile 160T to steer itself along this planned path. The steering command signals are communicated via RF communication signals from the base RF communications system 136 to the projectile RF communications system 178. The steering module 180M of the onboard steering system 180 processes the steering command signals and correspondingly actuates the steering actuators 184A, 184B to drive the steering mechanisms 182A, 182B to adjust the aerodynamic control surfaces 183A, 183B as needed to redirect the projectile 160.

In some embodiments, the projectile 160T is released from the base module 111 at an altitude in the range of from about 500 ft to 10,000 ft.

In some embodiments, the projectile 160T has a terminal velocity in the range of from about 45 m/s to 300 m/s.

In some embodiments, the target tracking system 140 tracks the position of the target T before the base module 111 drops the projectile 160T. In some embodiments, the target tracking system 140 tracks the position of the target T continuously or periodically while the projectile 160T is inflight (i.e., between the time the base module 111 drops the projectile 160T and the projectile 160T strikes the target T, or lands on the ground G or elsewhere). In some embodiments, the target tracking system 140 tracks the position of the target T both before the projectile 160T is released and throughout the substantial entirety of the flight of the projectile 160T.

In some embodiments, the projectile guidance system 142 tracks and commands the steering of the projectile 160T continuously or periodically while the projectile 160T is inflight. In some embodiments, the projectile guidance system 142 tracks and commands the steering of the projectile 160T throughout the substantial entirety of the flight of the projectile 160T.

Accordingly, the projectile 160T operates as a kinetic, hit-to-kill projectile that is external command-guided by the base module 111. The base system 110 executes automatic and programmatic tracking of the target T, and automatic and programmatic tracking of the projectile 160T. The base system 110 automatically and programmatically determines the proper projectile trajectory or path to cause collision between the projectile 160T and the target T, and updates this determination while the projectile 160T is inflight. The base system 110 automatically and programmatically determines the appropriate projectile steering adjustments or responses to cause the projectile 160T to follow this path to the target T, and updates the steering adjustments response to course corrections determined by the base system 110. The base system 110 automatically and programmatically commands the projectile 160T to make the determined appropriate projectile steering adjustments.

In some embodiments, the projectile delivery system 100 automatically and programmatically executes each of the steps and functions described above after the operator has initiated the attack (i.e., instructed the base system 110 to proceed with the attack via the remote station). It will be appreciated that this protocol retains the operator in the command loop up until the attack is initiated, but does not require operator intervention thereafter to complete the attack.

In some embodiments, the weaponized aerial vehicle 101 is configured such that the aerial vehicle 20 is automatically placed in a tracking/guidance mode when the kinetic projectile 160T is released and in flight. In the tracking/guidance mode, flight of the aerial vehicle 20 is controlled to optimize guidance of the kinetic projectile 160T.

In some embodiments, the camera 130 or 132 of the projectile tracking system 140 that is used to track the inflight projectile 160T is secured to the aerial vehicle 20 without a gimbal.

In some embodiments, the target tracking system 140 uses data acquired from one or more of the cameras 130, 132 capturing radiation (e.g., light) from the target T to track the target T. In some embodiments, camera(s) sense radiation (e.g., visible light, IR, or UV) from the target T. In some embodiments, the target tracking system 140 tracks the target T using computer vision based on the image data from the camera(s) 130, 132.

In some embodiments, the weapon system 10 also uses a designation laser 42 (FIG. 1) from a laser source 40 that is not located on the base module 111 or on the projectile 160T. In some embodiments, the laser source 40 is not located on the aerial vehicle 20. The laser source 40 is instead located completely remote from the launch platform. The laser 42 is used to provide target designation by illumination of the target T or a corresponding spot. The target tracking system 140 functions in substantially the same manner as discussed above, with the laser illumination being detected by the base module camera systems. In some embodiments, the illumination image would override other target criteria, with the computer vision system tracking the laser illumination and command-guiding the projectile 160T to the laser illumination.

In some embodiments, the projectile tracking system 144 uses data acquired from one or more of the cameras 130, 132 capturing radiation (e.g., light) from the projectile 160T to track the projectile 160T. In some embodiments, camera(s) sense radiation (e.g., visible light, IR, or UV) from the projectile 160T. In some embodiments, the projectile tracking system 144 tracks the projectile 160T using computer vision based on the image data from the camera(s).

In some embodiments, the projectile tracking system 144 uses the self-designation feature 172 onboard the projectile 160T. The projectile tracking system 144 functions in substantially the same manner as discussed above, with the self-designation feature 172 being detected by the base module camera systems. In some embodiments, the self-designation feature 172 illumination image would override other projectile tracking criteria, with the computer vision system tracking the self-designation feature 172.

In some embodiments, the projectile guidance system 142 controls the flight of the released projectile 160T using only one-way RF signal communication between the base system 110 and the projectile 160T. As discussed above, the base system 110 sends steering commands to the kinetic projectile 160T. However, the kinetic projectile 160T does not send signals to the base system 110.

In some embodiments, the projectile guidance system 142 controls the flight of the released projectile 160T using two-way RF signal communication between the base system 110 and the projectile 160T. As discussed above, the base system 110 sends steering commands to the kinetic projectile 160T. The kinetic projectile 160T sends projectile status data to the base system 110 via RF transmission to incorporate into the projectile tracking and guidance processing by the base system 110. In some embodiments, the projectile status data includes at least one of: a magnetometer-based heading reading; an airspeed of the projectile 160T; an altitude of the projectile 160T; an attitude of the kinetic projectile 160T; an orientation of the kinetic projectile 160T; and a rate of rotation of the kinetic projectile 160T about each of a roll axis, a pitch axis, and a yaw axis. The kinetic projectile 160T may include an onboard projectile state sensor that acquires the projectile status data instantaneously (e.g., one or more of the sensors 170).

The projectile control system 146 can control the onboard steering system 180 both to change or follow a flight path and to stabilize the projectile 160T inflight. According to some embodiments, the steering mechanisms 182A, 182B is configured such that the fins 183A can be rotated in opposing directions to cause the projectile 160T to roll in either direction (i.e., leftward or rightward rotation about the axis L-L), and the canards 183B can be rotated in the same direction to adjust the pitch of the projectile 160T.

In some embodiments, the projectile delivery system 100 is operated to release and drop multiple projectiles 160 (i.e., a salvo of the projectiles 160) from the base module 111. The released projectiles 160 can be tracked, guided and controlled by the base system 110 in the same manner as described above for the projectile 160T. The projectiles 160 of the salvo can all be guided to the same target T or to different targets.

The remote station 30 can enable or support operator interaction with the base system 110. In some embodiments, the remote station 30 communicates with the base system 110 via two-way RF signal communication. The remote station 30 may be located apart from the weaponized aerial vehicle 101. For example, the remote station 30 may be a ground-based device. In other embodiments, the remote station 30 may be on or integrated into the aerial vehicle 20.

Figure 10:
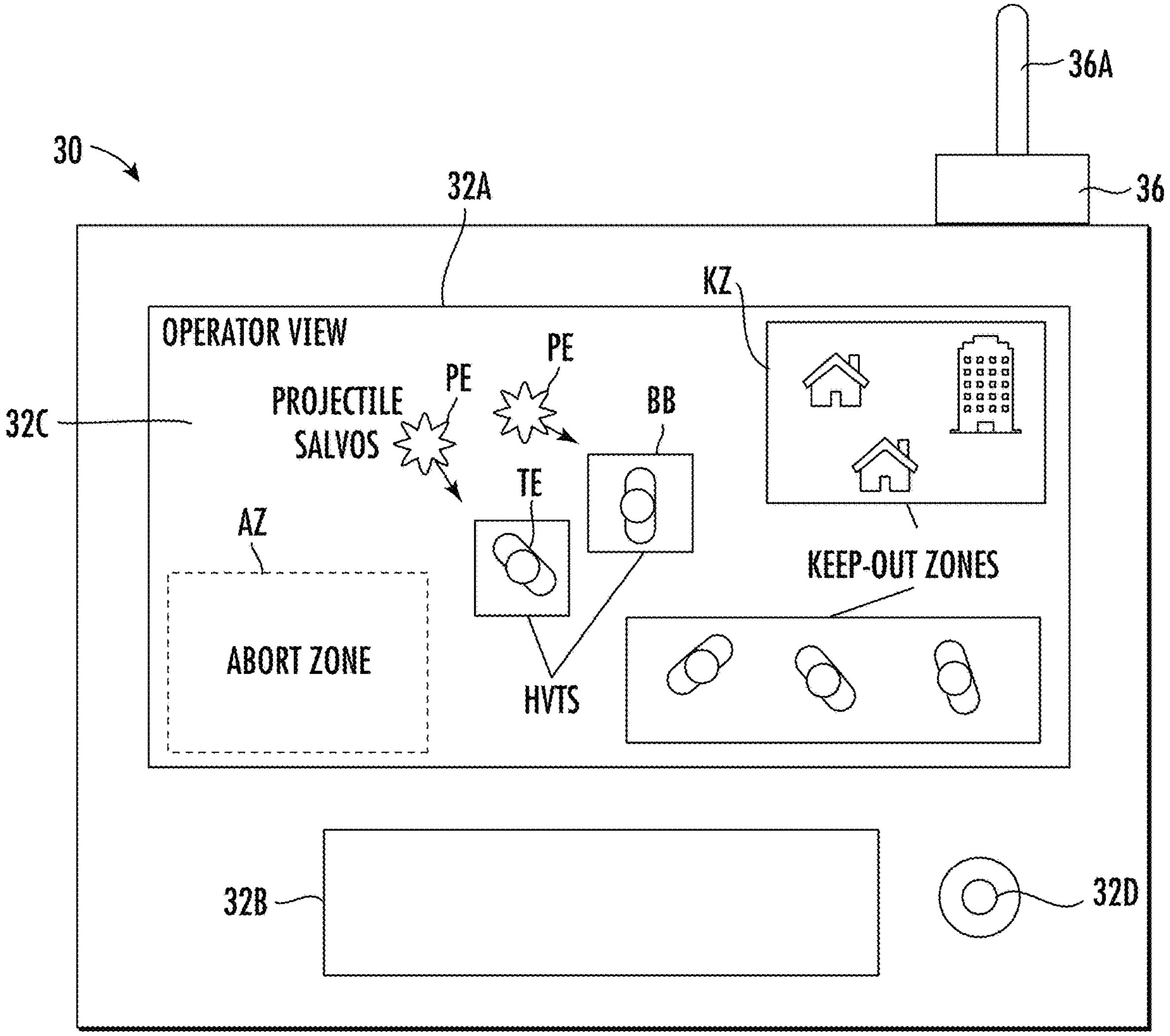
FIG. 10 is a plan view of a remote control station forming a part of the weapon system of FIG. 1.

FIG. 10 shows an example operator view on the remote station display 32A. In the example interface, the operator view may include certain helpful visual elements (e.g., as discussed below) to assist the operator in assessing the target region, entering instructions and monitoring the progress of the attack.

In some embodiments, the operator uses the remote station 30 to designate the target T. The remote station 30 may list or display target candidates from which the operator selects.

As discussed herein, in some embodiments, after the target is selected and the operator enters the command to attack, all target tracking, projectile tracking, and projectile steering is automatically and programmatically controlled by the base system 110 without operator input.

The remote station 30 may be configured to enable the operator to abort the attack. Responsive to an operator abort command, the base system 110 will automatically and programmatically steer the inflight projectile 160T away from the target T. In some embodiments, the remote station 30 is configured to enable the operator to designate an abort zone (indicated by abort zone graphical element AZ) to which the base system 110 will automatically and programmatically steer the inflight projectile 160T responsive to an abort command, if any.

The remote station 30 may be configured to enable the operator to designate one or more keep out zones (indicated by keep out zone graphical element KZ). The base system 110 will automatically and programmatically steer the inflight projectile 160T away from each keep out zone if the projected terminal vector of the projectile 160T is in the keep out zone.

The remote station 30 may be configured to enable the operator to designate the number of projectiles 160 to drop onto the target T.

The remote station 30 may be configured to display a virtual tracking of the target T and the projectile 160T. For example, in FIG. 10 the display 32A shows a projectile (or projectile salvo) graphical element PE representing the inflight projectile 160T, a target graphical element TE representing the target T, and a bounding box graphical element BB. In some embodiments, the remote station 30 updates the display substantially in real time.

The remote station 30 may also be configured to display a live or intermittent image feed from one or more of the base system cameras 130, 132. In some embodiments, the camera feed shows the target T. In some embodiments, the camera feed shows the inflight projectile 160T.

In accordance with further embodiments, the projectile delivery system 100 is used to deliver a projectile 160T to sense an environmental condition. In this case, the weaponized aerial vehicle 101 and the projectile delivery system 100 are used to release and steer a projectile 160T to a target location. The target location may be designated by an operator using the remote station 30 as described above for the target T.

Once the projectile 160T has landed at or proximate the target location, the sensor 170 is operated to detect the environmental condition. The environmental condition may include, for example, sound (e.g., eavesdropping), vibration, temperature, soil composition, air composition, radio-frequency signals. The projectile 160T can deposit in the target location quietly and undetected, and can remain in the target location for persistent data gathering.

In some embodiments, the projectile 160T transmits (via RF signal communication) the environmental condition data acquired by the sensor 170 to the remote station 30 or to the base station 110, which may relay the environmental condition data to the remote station 30 or elsewhere. In some embodiments, the projectile 160T records the environmental condition data acquired by the sensor 170 using a recording device 173 (FIG. 9) forming a part of the projectile 160T.

In some embodiments, each projectile 160 does not include or carry explosive material or incendiary material.

In some embodiments, the projectiles 160, when released, are driven downward only by gravity.

In some embodiments, each projectile 160 does not include or carry an onboard propulsion mechanism.

In some embodiments, each projectile 160 does not include or carry an onboard target tracking system.

In some embodiments, each projectile 160 does not include or carry an onboard projectile guidance system.

In some embodiments, each projectile 160 does not include or carry a GPS signal receiver.

The projectile delivery system 100 requires no targeting sensor on the kinetic projectile 160. The projectile delivery system 100 does not require illumination (e.g., a designation laser beam) or other signal generation from the weaponized aerial vehicle 101 or the kinetic projectile 160. Instead, the projectile delivery system 100 may leverage computer vision systems that sense radiation (visible light, IR, UV, etc.) for targeting and projectile guidance. Elimination of signal sources allows for a simpler, lighter, cheaper system.

In some embodiments, the projectile delivery system 100 is a command-guided type system wherein target sensing and projectile guidance is done exclusively by the launch platform. Launch platform cameras, or camera, are used to image both targets and projectiles inflight. Cameras may have sensitivity to visible light, infrared, or other light frequencies. In some embodiments, computer vision algorithms are used to continuously analyze the camera images to identify and track targets. Light sources maybe used on the projectile to enhance tracking. These light sources would typically be outside the visible range, and system operation depends only on detection by the base module 111 (the launch platform).

Projectile delivery systems according to embodiments of the invention can be platform agnostic. Lethality is provided by the potential energy of gravity. The projectile is guided by the base system, so that the projectile delivery system does not require or use GPS guidance. Guidance algorithms and calculations are done on the base system. Moving this work to the base system means cheaper, simpler, lighter projectiles. This allows a given projectile delivery module 102 to include more projectiles.

In some embodiments, the kinetic projectiles are hit-to-kill projectiles, without incendiary or explosive material, which greatly reduces the potential for collateral damage. The projectiles can present a small acoustic signature.

Omission of light sources, guidance processing, and the like from the projectiles can provide several advantages. The projectiles 160 can be less costly and less complex. The projectiles 160 can be lighter and smaller. These reductions can reduce the acoustic signatures of the projectiles. These reductions can also reduce the power requirement to carry the projectile delivery module 102, thereby enhancing the operational endurance of the weaponized aerial vehicle 101.

In some embodiments, the base module 111 is reusable. For example, the base module 111 can be reloaded with projectiles 160 and/or can be remounted on a second aerial vehicle.

Figure 11:
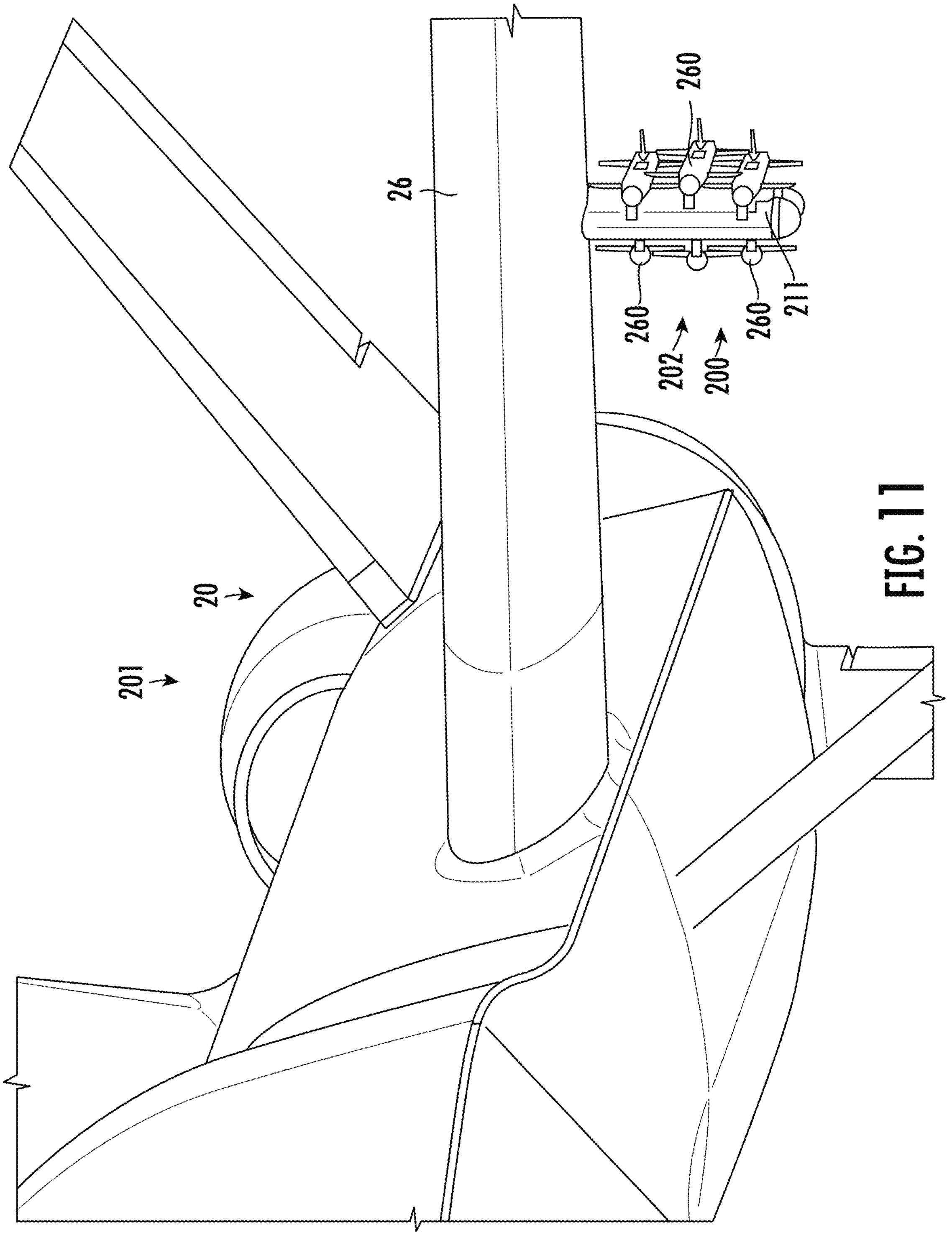
FIG. 11 is an enlarged, fragmentary, bottom perspective view of a weaponized aerial vehicle according to further embodiments.
Figure 12:
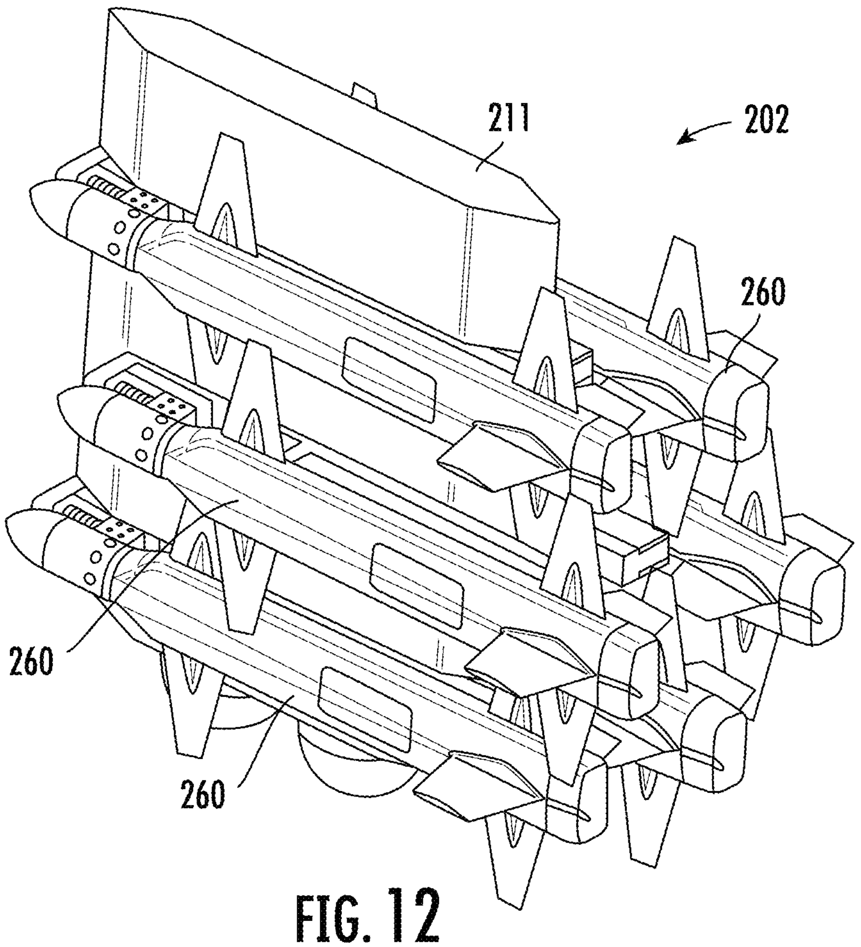
FIG. 12 is top, rear perspective view of a projectile delivery module forming a part of the weaponized aerial vehicle of FIG. 11.
Figure 13:
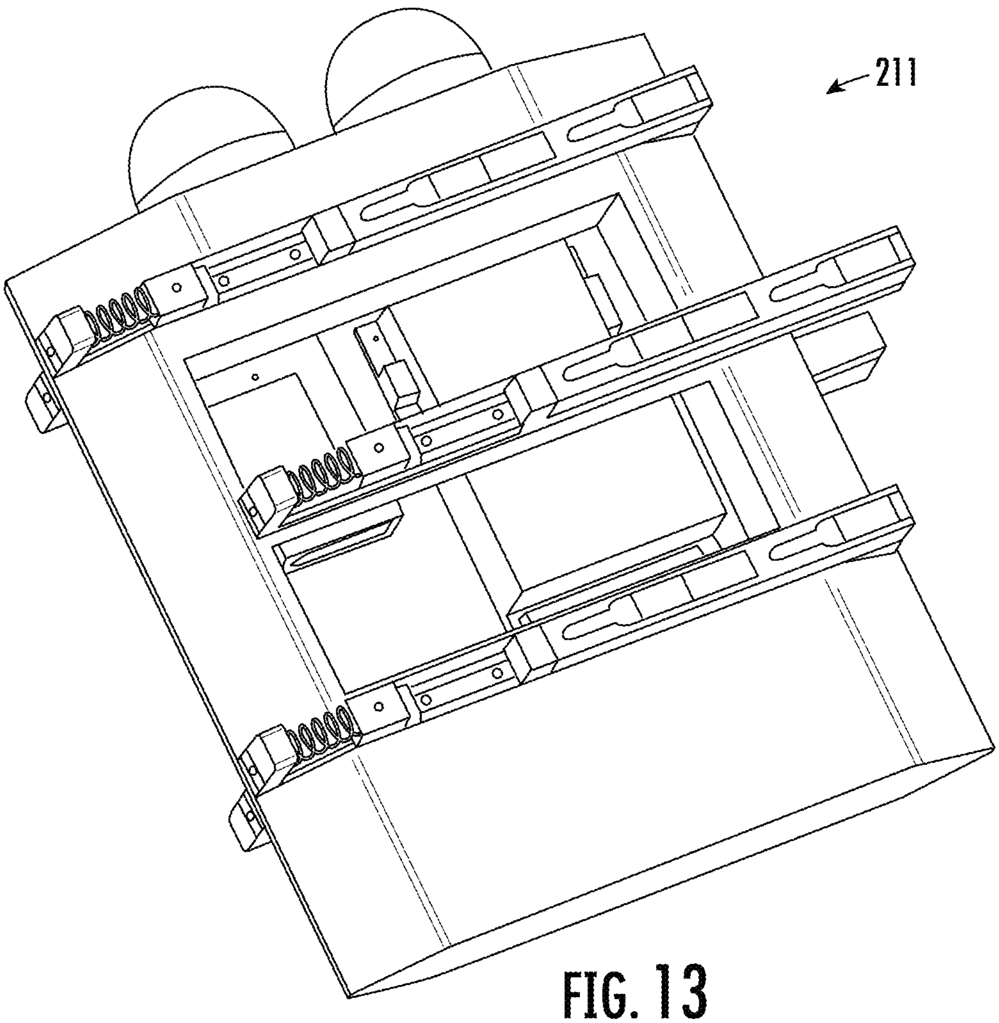
FIG. 13 is bottom, front perspective view of the projectile delivery module of FIG. 12.

With reference to FIGS. 11-13, a projectile delivery system 200 and a weaponized aerial vehicle 201 according to further embodiments are shown therein. The projectile delivery system 200. The projectile delivery system 200 includes a projectile delivery module 202 including a base module 211 and projectiles 260 corresponding to the projectile delivery module 102, the base module 111, and the projectiles 160, respectively, of the projectile delivery system 100. The projectile delivery system 200 and a weaponized aerial vehicle 201 may be used in the same manner as the projectile delivery system 100 and the weaponized aerial vehicle 101. The projectile delivery system 200 differs from the projectile delivery system 100 in that the projectile delivery module 202 is configured to be mounted on a wing 26 or pylon of the aerial vehicle 20.

Figure 14:
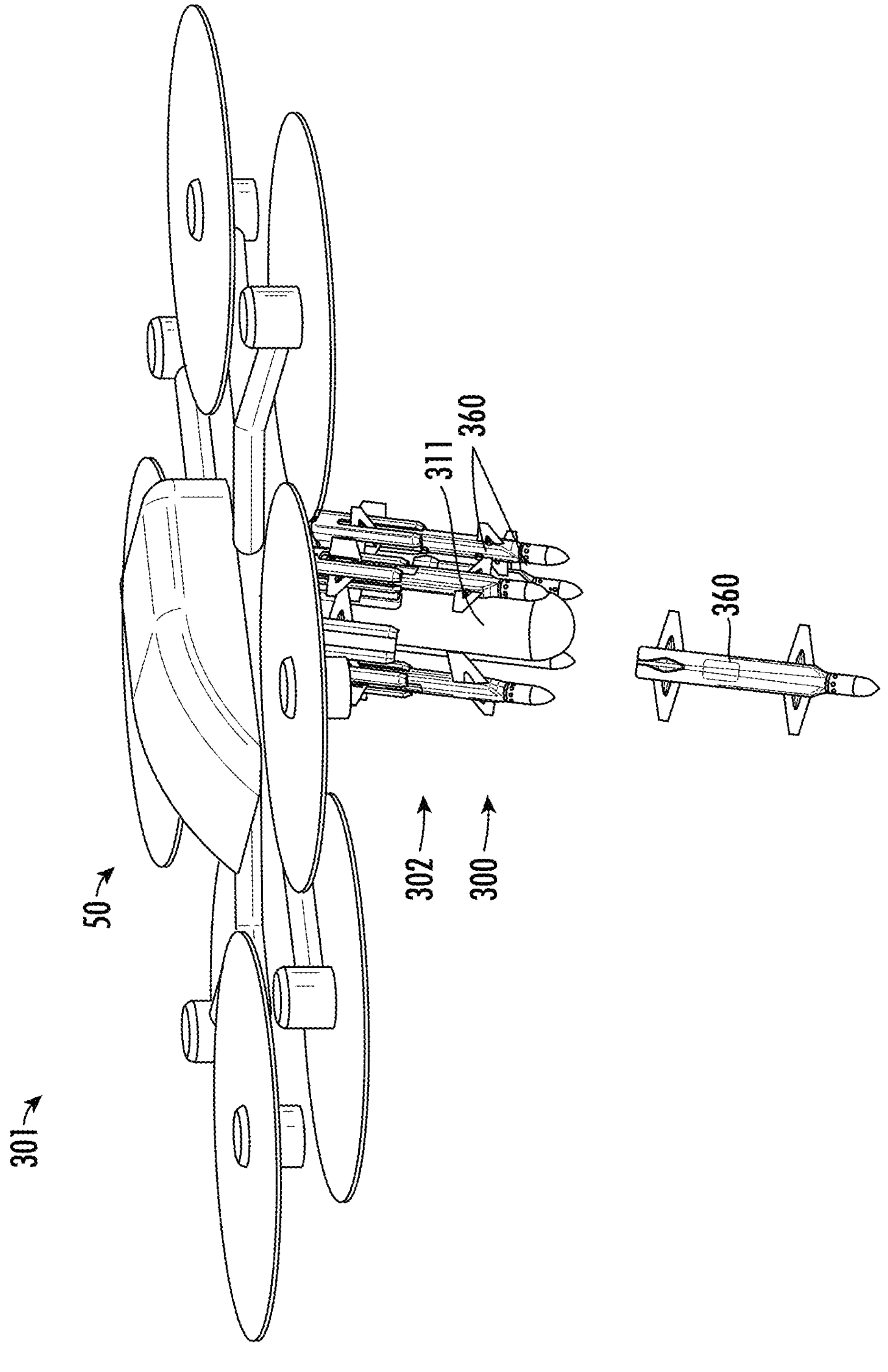
FIG. 14 is a perspective view of a weaponized aerial vehicle according to further embodiments.
Figure 15:
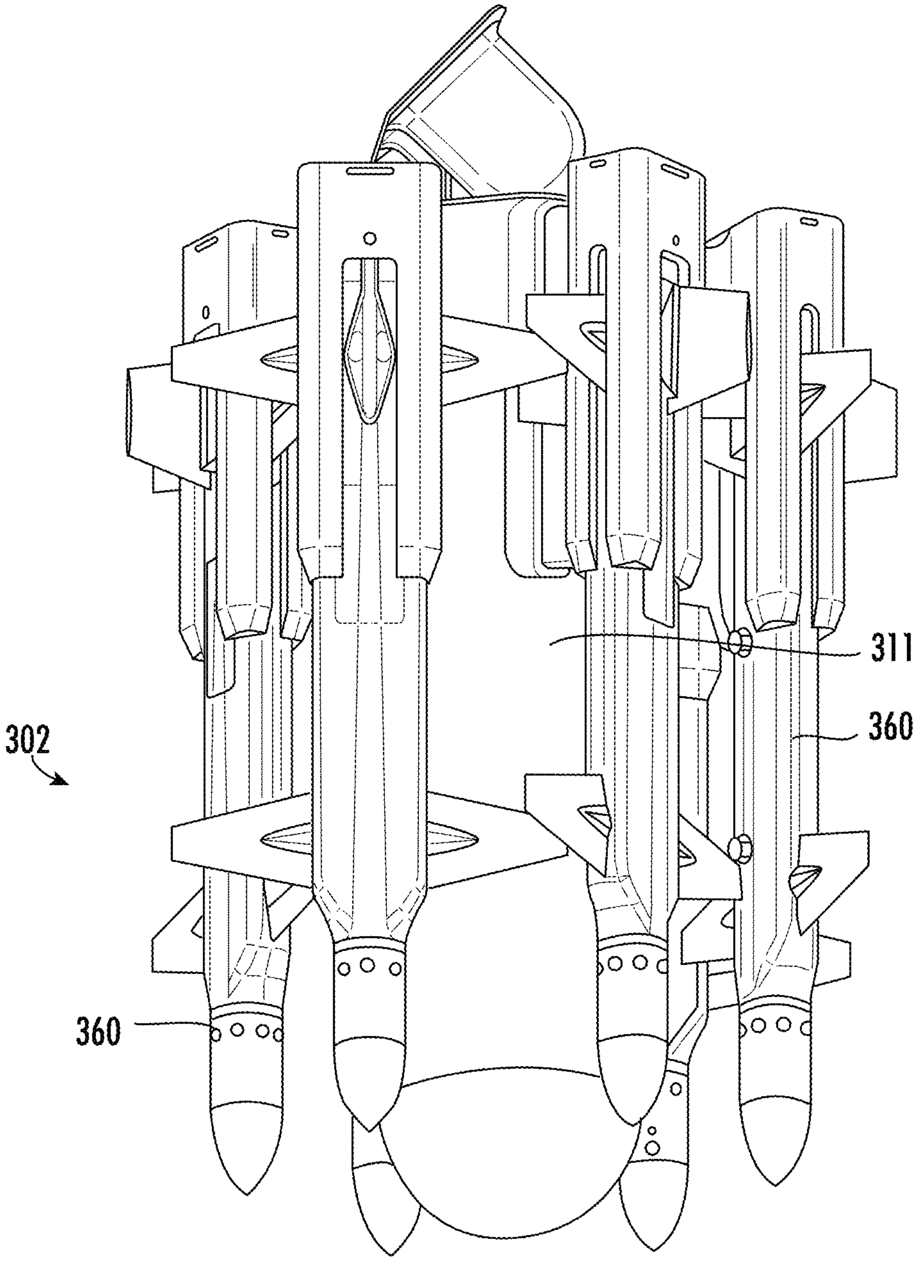
FIG. 15 is a perspective view of a projectile delivery module forming a part of the weaponized aerial vehicle of FIG. 14.
Figure 16:
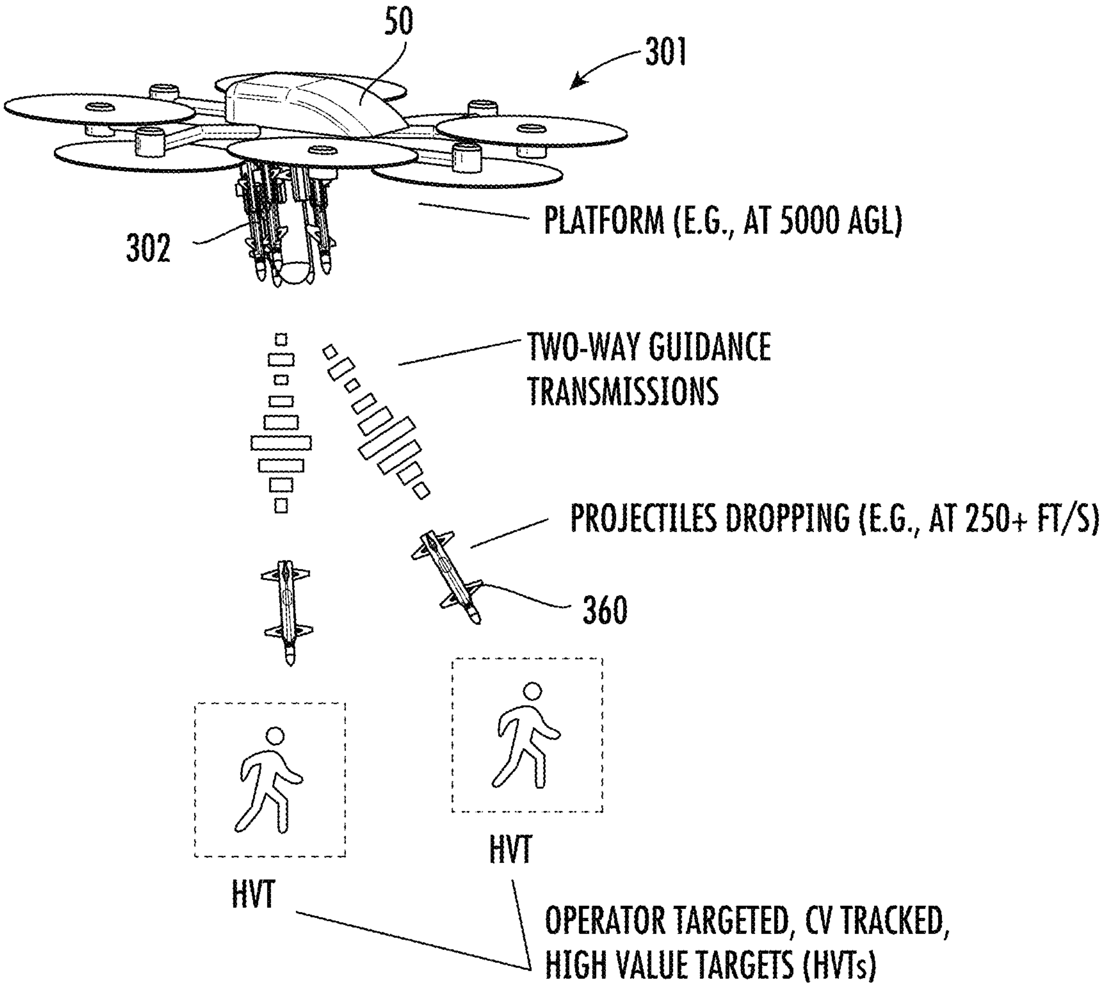
FIG. 16 is a schematic view illustrating use of the weaponized aerial vehicle of FIG. 14.

With reference to FIGS. 14-16, a projectile delivery system 300 and a weaponized aerial vehicle 301 according to further embodiments are shown therein. The projectile delivery system 300. The projectile delivery system 300 includes a projectile delivery module 302 including a base module 311 and projectiles 360 corresponding to the projectile delivery module 102, the base module 111, and the projectiles 160, respectively, of the projectile delivery system 100. The projectile delivery system 300 and a weaponized aerial vehicle 301 may be used in the same manner as the projectile delivery system 100 and the weaponized aerial vehicle 101. The projectile delivery system 200 differs from the projectile delivery system 100 in that the projectile delivery module 302 has a turret configuration that is well-suited for mounting on the underside of an aerial vehicle 50 such as a UAV quadcopter.

In some embodiments, one or more of the kinetic projectiles mounted on and launchable from the projectile delivery system includes an energetic payload. In some embodiments, the kinetic projectile is a proximity locating projectile including an energetic payload, and is intended to exercise (e.g., detonate) its energetic payload to multiple targets in an open environment, or through lightly armored commercial vehicles, or by deforming a metal liner in a controlled manner as to deliver damage effects onto a target. In some embodiments, the kinetic projectile is a penetrating projectile including an energetic payload, and intended to perforate thin metal or multiple layers of thin metal sheeting of a target, survive the penetrating impact event, and exercise its energetic payload onto the intended targets of interest following the penetrating impact event.

An energetic payload as discussed above may be of any suitable type and may be integrated into the kinetic projectile in any suitable manner. In some embodiments, the energetic payload forms a part of a warhead integrated within the kinetic projectile.

In some embodiments, the kinetic projectile includes a fragment projection warhead including fragments and/or a casing and containing high explosive energetics (e.g., plastic bonded explosives such as PBXN-9). When detonated, the high explosive drives the fragments, or fragments formed from the casing, outward into the target(s). The warhead thus operates as a grenade-like device. The warhead may include pre-formed fragments and/or explosively formed fragments from a pre-scored casing.

In some embodiments, the kinetic projectile includes a "flash-bang" device that is intended to temporarily stun or incapacitate personnel. In this case, the energetic payload is a combustible material that is detonated or ignited to generate the flash-bang effect.

In some embodiments, the kinetic projectile includes a shaped charge (or charges) configured to sever or breach structures or pierce armor when actuated by detonation of the energetic payload. The shaped charge includes a high explosive (the energetic payload) and a metal liner that is compressed by the high explosive detonation and projected against structures.

In some embodiments, the fragment projection warhead includes explosively formed projectiles configured to pierce armor.

In some embodiments, the kinetic projectile includes an incendiary device including an incendiary material (the energetic payload). In some embodiments, the incendiary material generates pyrophoric reactions when actuated. In some embodiments, the incendiary device is actuated to a start fire at a target or a target location proximate the kinetic projectile.

In some embodiments, the kinetic projectile further includes an integral, onboard fuze system to actuate (e.g., detonate or ignite) the energetic payload. In some embodiments, the fuze system includes a safe-arm-fire (SAF) device and one or more sensors that provide signals to initiate the energetic payload. The SAF device may be either electronic or mechanical in nature. The SAF device may rely on a range of sensors. In some embodiments, the sensor(s) include a sensor specifically for a "height-of-burst" (HOB) type operation, where the sensor senses proximity, to the ground or targeting surfaces, and sends a trigger to the SAF device when some predetermined criteria is met. HOB sensors typically utilize radar, laser distance measuring, or optical means such as stereo vision. In some embodiments, the sensor(s) include one or more of an accelerometer, a gyro, a pressure sensor, a mechanical closure or opening of an electronic circuit, a timer, each of which may be integral to the SAF device. The SAF device can ensure some minimum safe separation of the kinetic projectile from the point of launch by processing sensor signals and applying conditional logic to arm the subsystem for fire accordingly. Once armed, the SAF device's sensor inputs are processed to determine the timing or position of the kinetic projectile for when/where the SAF device initiates the energetic (e.g., explosive) payload.

The energetic payload may be disposed at any suitable location within the kinetic projectile. In some embodiments, the energetic payload and the fuze system are located within the volume of an integral warhead forming a part of the kinetic projectile. In some embodiments, the energetic payload and the fuze system are located in a forward section of the kinetic projectile body and the forward end of energetic payload housing may form the nose of the kinetic projectile.

The nose of the kinetic projectile may have a shape and be composed of a material that enhances the penetration capability of the kinetic projectile warhead into a target. Suitable nose shapes may include ogive, conical, or blunt.

In some embodiments, the kinetic projectile is configured (e.g., the fuze system is configured) such the energetic payload is fired after target perforation. In some embodiments, the kinetic projectile is configured to accomplish this by firing the energetic payload at a known or prescribed distance or time from first impact of the kinetic projectile with a target surface.

Figure 17:
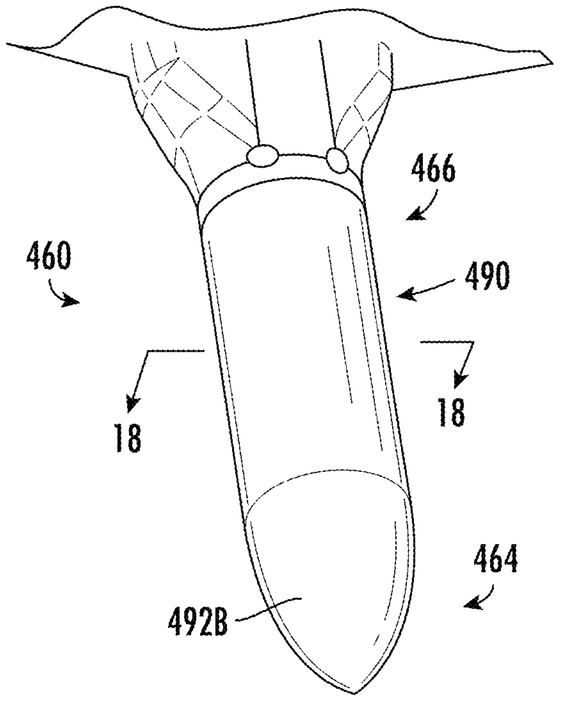
FIG. 17 is a fragmentary, top perspective view of a kinetic projectile according to further embodiments.
Figure 18:
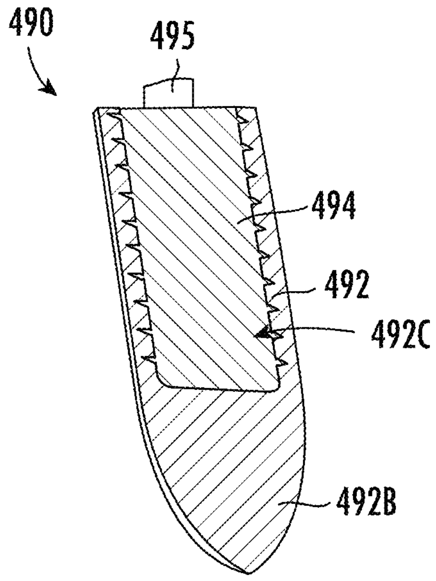
FIG. 18 is a fragmentary, cross-sectional view of a warhead forming a part of the kinetic projectile of FIG. 17 taken along the line 18-18 of FIG. 17.
Figure 19:
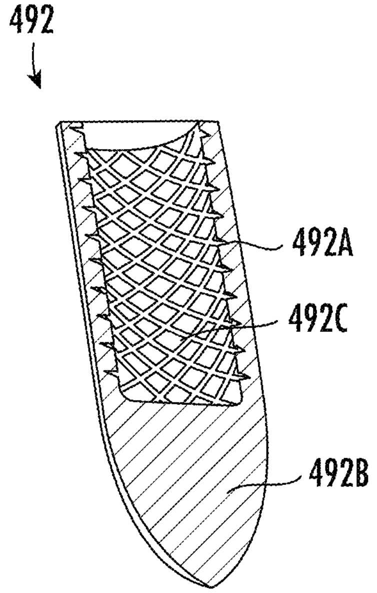
FIG. 19 is a fragmentary, cross-sectional view of a warhead housing forming a part of the warhead of FIG. 18 taken along the line 18-18 of FIG. 17.

With reference to FIGS. 17-19, an example kinetic projectile 460 according to further embodiments and including an energetic payload is shown therein. The kinetic projectile 460 corresponds to the projectile 160 and may be used in the same manner as the projectile 160 in the projectile delivery system 100, 200, or 300, except as follows.

The kinetic projectile 460 includes a warhead 490. The warhead 490 forms the front section of the projectile body 466 and the projectile nose 464. The warhead 490 includes a warhead housing 492. As shown in FIG. 19, the warhead housing 492 includes a pre-scored fragmenting case 492A and an integrated nose 492B defining a cavity 492C. The nose 492B is configured to perforate a target. As shown in FIG. 18, the cavity 492C is filled with an energetic material 494 as described above. In some embodiments, the energetic material 494 is a high explosive material as discussed above. The kinetic projectile 460 further includes a fuze system 495 as discussed above. The fuse system 495 may be integrated into the warhead 490.

In use, the kinetic projectile 460 is launched from a projectile delivery system of a weaponized aerial vehicle (e.g., the projectile delivery system 100 and the weaponized aerial vehicle 101) and guided to a target as disclosed herein. At a desired location relative to the target, the fuze system 495 detonates the energetic material 494, which fragments the fragmenting case 492A and projects the fragments formed thereby at high velocity into the target. In some embodiments, the fuze system 495 postpones or delays its detonation of the energetic material 494 until the kinetic projectile 460 has penetrated the target.

Figure 20:
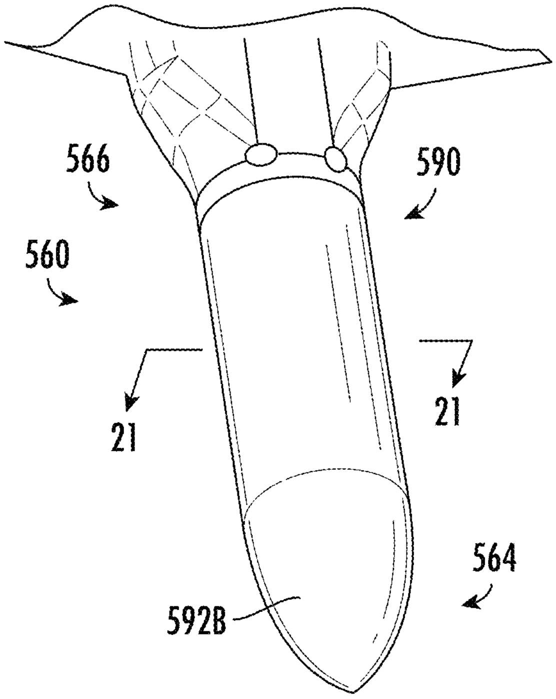
FIG. 20 is a fragmentary, top perspective view of a kinetic projectile according to further embodiments.
Figure 21:
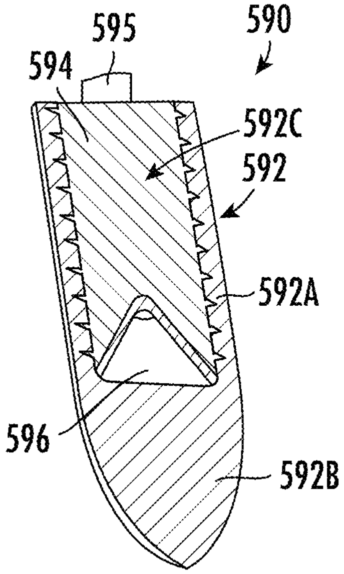
FIG. 21 is a fragmentary, cross-sectional view of a warhead forming a part of the kinetic projectile of FIG. 20 taken along the line 21-21 of FIG. 20.
Figure 22:
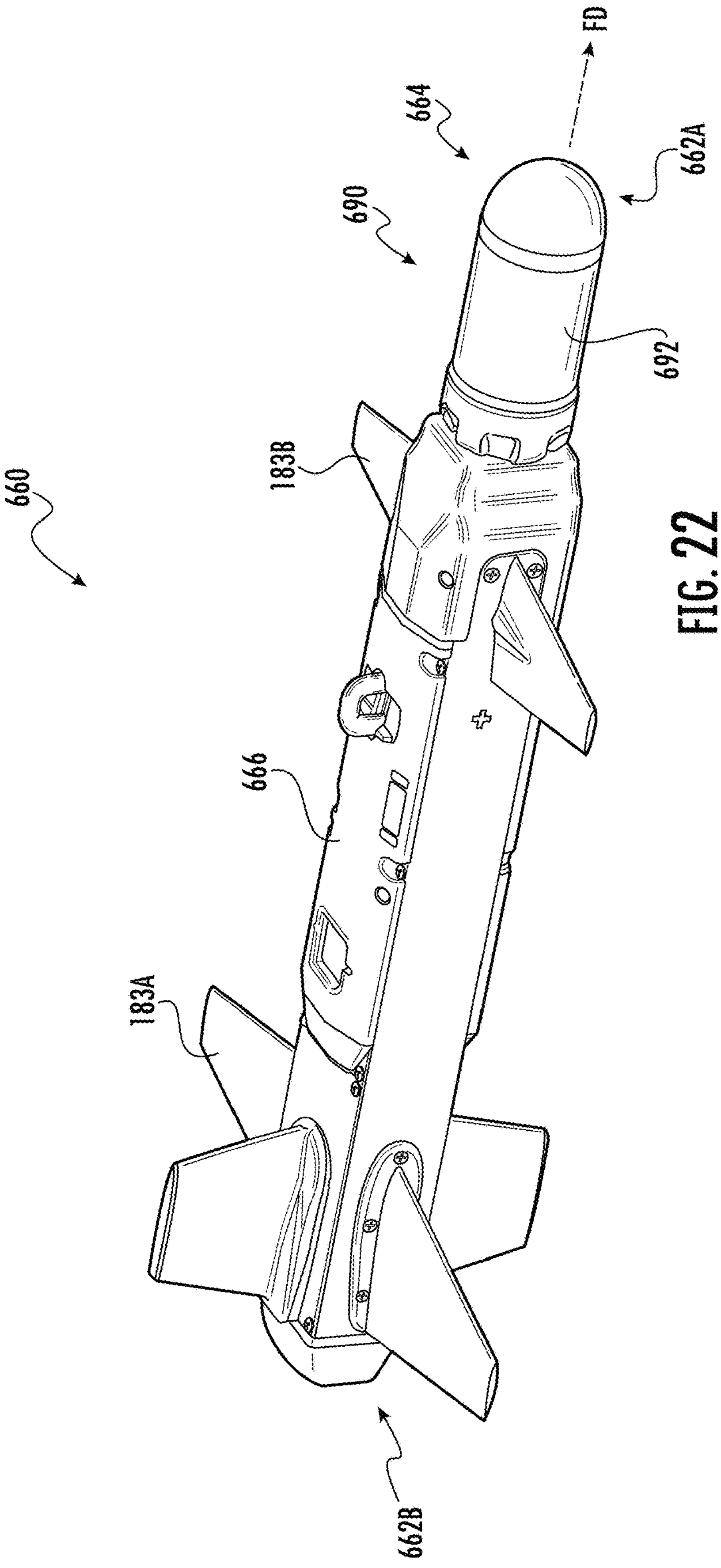
FIG. 22 is a top, front, perspective view of a projectile according to further embodiments.
Figure 23:
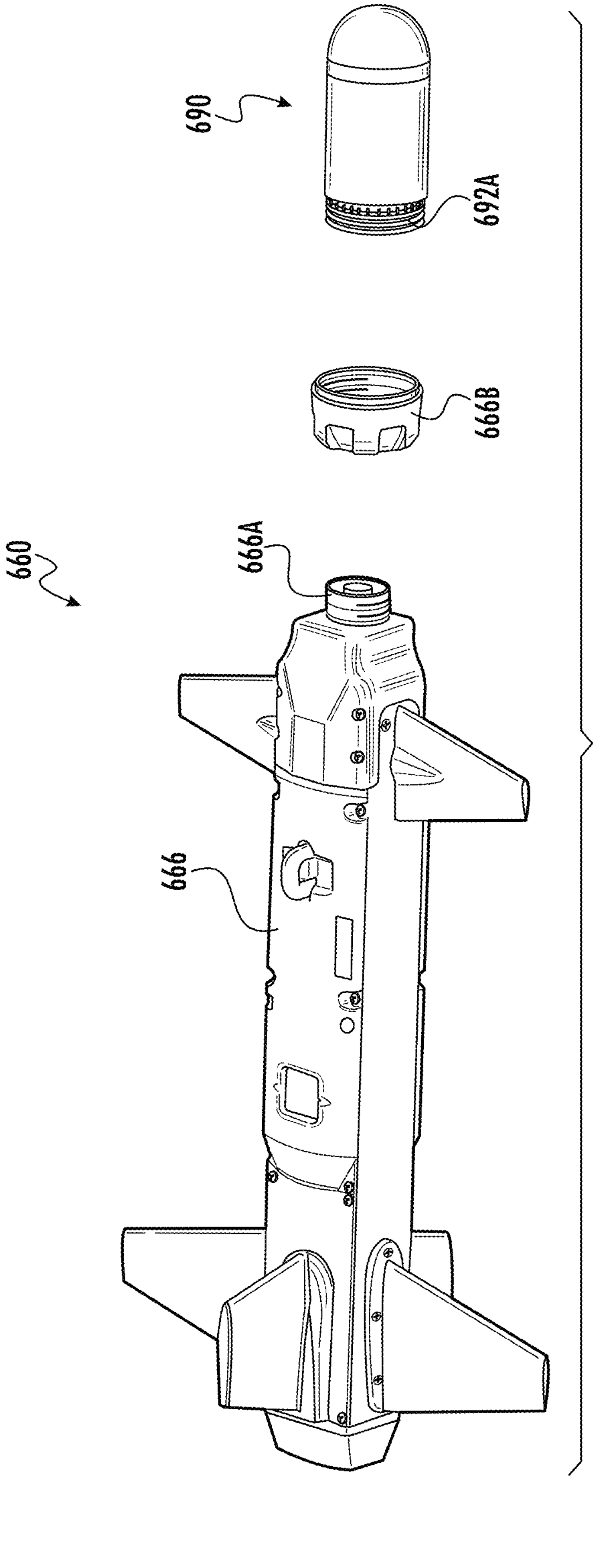
FIG. 23 is an exploded, perspective view of the projectile of FIG. 22.

With reference to FIGS. 20-21, an example kinetic projectile 560 according to further embodiments and including an energetic payload is shown therein. The kinetic projectile 560 may be constructed and used in the same manner as the projectile 460, except as follows.

The kinetic projectile 560 includes a warhead 590. The warhead 590 forms the front section of the projectile body 566 and the projectile nose 564. The warhead 590 includes a warhead housing 592. The warhead housing 592 includes a pre-scored fragmenting case 592A (which may be constructed as shown for the case 492A in FIG. 19) and an attached, frangible nose 592B defining a cavity 592C. The nose 592B is configured to perforate a target.

The cavity 592C is partly filled with an energetic material 594 as described above. In some embodiments, the energetic material 594 is a high explosive material as discussed above. The cavity 592C also contains, at its front end, a metal explosively driven liner, explosively formed penetrator (EFP), or shaped charge jet (SCJ) 596.

The kinetic projectile 560 further includes a fuze system 595 as discussed above. The fuse system 595 may be integrated into the warhead 590.

The kinetic projectile 560 will operate in the same manner as the projectile 460 when detonated by the fuse system 595, except that, in addition to the fragmenting and projection of the case 592A, the metal liner 596 will be compressed by the high explosive detonation and projected against the target.

With reference to FIGS. 22-27, an example projectile 660 according to further embodiments and including an energetic payload is shown therein. The projectile 660 may be constructed and used in the same manner as the projectile 560, except as follows.

The projectile 660 has a leading, forward or front end 662A and an opposing tail or rear end 662B, a body 666, a nose section 664 at the end 662A, a warhead 690 forming part of the nose section 664, and an onboard fuze system 695.

Figure 26:
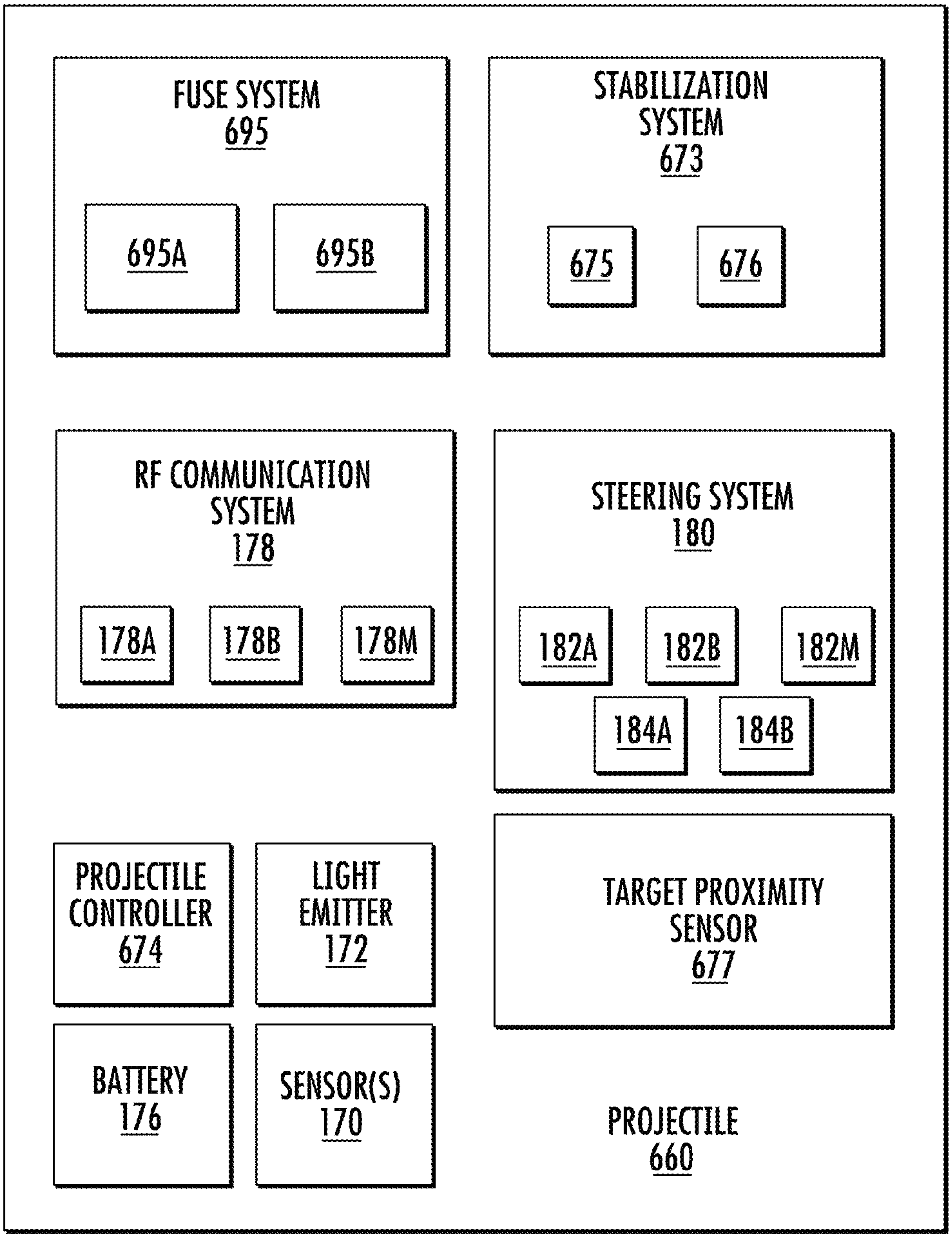
FIG. 26 is a schematic view representing the projectile of FIG. 22.

With reference to FIG. 26, in addition to the electronic and control components designated 170, 172, 174, 176, 178, 178A, 178B, 178M, 180, 180M, 182A, 182B, 183A, 183B, 184A, and 184B (FIGS. 7 and 9) and discussed above with regard to the projectile 160, the projectile 660 includes an onboard projectile stabilization system 673 and one or more target proximity sensors 677. The projectile 660 includes a projectile controller 674 corresponding to, constructed and operative to perform the functions described herein for the projectile controller 174.

The onboard projectile stabilization system 673 (FIG. 26) includes a projectile stabilization controller 675 and one or more projectile status sensors 676. The projectile stabilization controller 675 may take the form of computer program code modules that may be embodied in software and/or firmware as discussed below. The projectile stabilization controller 675 may be embodied in the projectile controller 674.

As discussed below, the projectile status sensor(s) 676 are operative to detect conditions of the projectile 660 relative to its immediate environment. In some embodiments, these conditions include one or more of: a magnetometer-based heading reading; an airspeed of the projectile 660; an altitude of the projectile 660; an attitude of the projectile 660; an orientation of the projectile 660; and a rate of rotation of the projectile 660 about each of a roll axis, a pitch axis, and a yaw axis. The projectile status sensor(s) 676 may include a magnetometer, a pitot or Kiel probe, micro-electro-mechanical-system (MEMS) pressure sensors, slotted probe or float vane angle of attack sensors, MEMS gyros, MEMS accelerometers, and time-of-flight optical sensors.

As discussed below, the target proximity sensor(s) 677 are operative to detect proximity to or distance from a target when the projectile 660 has arrived near to the target. The target proximity sensor(s) 677 may include a "height-of-burst" (HOB) sensor. The HOB sensor may utilize radar, laser distance measuring, radiofrequency, or optical means such as stereo vision.

The warhead 690 (FIGS. 24 and 25) includes a warhead housing 692, an energetic material 694 (referred to as the main charge), an explosive booster 697, a booster holder 697A, and a shaped charge jet (SCJ) liner 602. The energetic material is a high explosive (HE).

Figure 24:
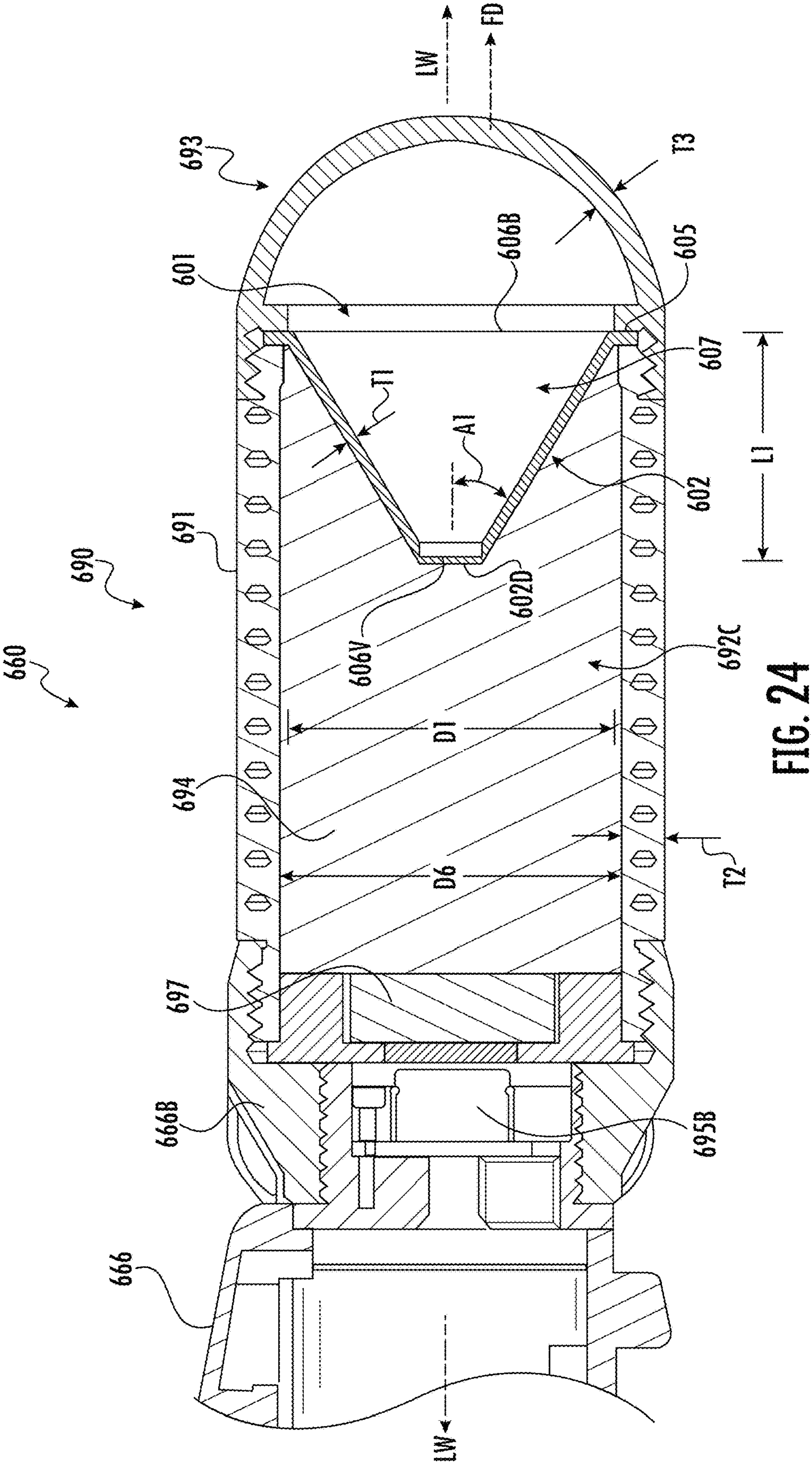
FIG. 24 is a fragmentary, cross-sectional view of the projectile of FIG. 22 taken along the line 24-24 of FIG. 22.

The warhead housing 692 includes a nose cover 693 and a warhead case 691. The nose cover 693 may be secured to the warhead case 691 by a threaded engagement as shown in FIG. 24, for example. The warhead housing 692 may be secured to the projectile body 666 by threads 692A (which may be integrally formed with the warhead case 691), an integral threaded flange 666A on the body 666, and a warhead coupler 666B, for example. A cavity 692C is defined in the warhead housing 692.

The main charge 694 and the SCJ liner 602 are disposed in the cavity 692C. The SCJ liner 602 is located between the main charge 694 and the nose cover 693. The main charge 694 and the SCJ liner 602 together form an SCJ assembly or SCJ 601.

Figure 25:
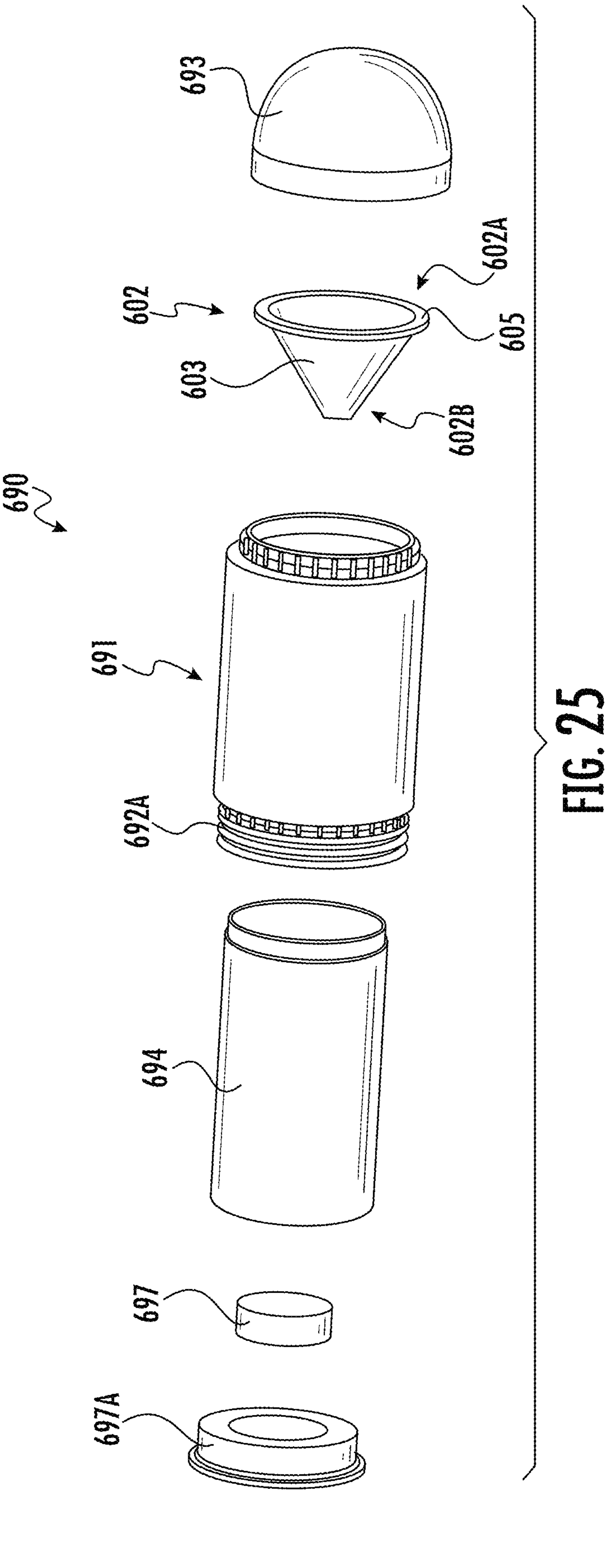
FIG. 25 is an exploded, top, front, perspective view of a warhead of the projectile of FIG. 22.

The SCJ liner 602 has a front end 602A and an axially opposing rear end 602B. The SCJ liner 602 includes a tubular body 603 that defines a cavity 607. In some embodiments (e.g., as shown in FIGS. 24 and 25), the body 603 is generally conical and tapers radially inwardly from a cone base 606B (at the front end 602A) to a cone vertex 606V (at the rear end 602B). In some embodiments, the SCJ liner 602 includes an integral base flange 605. The base flange 605 is seated and captured between the nose cover 693 and the warhead case 691 to retain and position the SCJ liner 602 in the warhead case 691.

The fuze system 695 includes a fuze controller 695A, an initiator 695B, and the onboard target proximity sensor(s) 677. The booster 697 is secured in the cavity 692C proximate the main charge 694 by the booster holder 697A. The initiator 695B is mounted in the booster holder 697A proximate the booster 697.

The SCJ liner 602 is a thin, metal, tubular structure. According to some embodiments, the SCJ liner 602 is formed of a metal including copper, steel, ductile iron, aluminum, or titanium. According to some embodiments, the SCJ liner 602 is formed of an alloy of one of these metals that provides high ductility for ease of forming. Additional orderly fine grain structures are also desirable. An important property to the penetration performance of the selected metals is a high bulk modulus and wave speeds in a shocked state. In some embodiments, the SCJ liner 602 is formed of oxygen free copper in a soft annealed state and 1100-0 aluminum.

In some embodiments, the SCJ liner 602 is generally cone-shaped. The SCJ liner 602 is generally concave relative to the warhead exterior and the front end 662A. However, the revolved liner cross-section may be more complex than a simple thin-walled cone.

In some embodiments, the diameter D1 (FIG. 24) of the SCJ liner 602 at the cone base 606B is in the range of from 20 mm to 40 mm and, in some embodiments, is about 36 mm.

In some embodiments, the length L1 of the SCJ liner 602 is in the range of from 25 mm to 45 mm and, in some embodiments, is about 35 mm.

In some embodiments, the cone angle A1 (FIG. 24) of the SCJ liner 602 is in the range of from 50 to 90 degrees and, in some embodiments, is about 65 degrees.

In some embodiments, the thickness T1 (FIG. 24) of the SCJ liner 602 is in the range of from 0.025 inch to 0.100 inch and, in some embodiments, is about 0.040 inch.

In some embodiments, the thickness of the SCJ liner 602 is substantially uniform from end 602A to end 602B of the body 603. In other embodiments (as discussed below), the thickness of the SCJ liner may be nonuniform along its length.

In some embodiments, the cone vertex 606V of the SCJ liner 602 is truncated to with a flat top end wall 602D as shown in FIG. 24, for example. In other embodiments, the vertex may be hemispherical or may come to a sharp point.

In some embodiments, the outer diameter of the flange 605 is in the range of from 2 to 10 percent greater than the outer diameter of the body 603 at the base 606B.

The main charge 694 may be any suitable high explosive. In some embodiments, the main charge 694 is a polymer bonded military-grade high explosive having a detonation wave speed near or above 8 km/s.

According to some embodiments, the main charge explosive 694 is a press-cast explosive such as PBXN-9 (92% HMX, 1.72 g/cc nominal density) or LX-14 (95.5% HMX, 1.8 g/cc nominal density). The main charge 694 may be pressed as a cylinder and then machined to fit inside of the warhead case 691 and mated to the outer surface of the SCJ liner 692. In some embodiments, the main charge 694 is shrink fit to the liner, and then the main charge/SCJ liner subassembly is fit into the warhead case 691.

According to some embodiments, the main charge explosive 694 is a pour-cast explosive such as PBXN-110 (88% HMX, 1.65 g/cc nominal density). In an uncured state the explosive is a slurry that can be poured into the aft end of the warhead case 691 with the liner 602 installed. The explosive slurry is subsequently cured at elevated temperatures.

In some embodiments (e.g., as shown in FIG. 24), the warhead case 691 is formed of metal and is designed to produce high kinetic energy, lethal fragments when the warhead 690 is exploded. The fragmenting warhead case 691 may have features on the internal and/or external surfaces, or features and voids inside the case wall, that produce an orderly breakup and narrow distribution of fragment masses. The warhead case 691 may include a plurality of high-density (e.g., metal) pre-formed fragments or projectiles.

In other embodiments, the warhead case 691 is formed of a low-density or highly frangible material, such as a plastic or frangible composite, designed to produce debris with relatively low kinetic energy when the warhead 690 is exploded. In some embodiments, the warhead 690 is configured such that it will not generate any fragments from the frangible case 691 or will only generate non-lethal, low-density fragments from the frangible case 691 when the warhead 690 is detonated.

In some embodiments, the outer diameter of the warhead case 691 is in the range of from 1 inch to 2.5 inches.

In some embodiments, the length of the warhead case 691 is in the range of from 2 inches to 3.25 inches.

In some embodiments, the thickness T2 (FIG. 24) of the warhead case 691 is in the range of from 0.06 inch to 0.25 inch.

The warhead case 691 may include threads on its aft end for mating to the projectile body 666. The warhead case 691 may have a reduced outer diameter on its aft end that can be inserted into the projectile coupler 666B, which is mounted on the projectile body 666. The warhead case 691 may be attached to the projectile body 666 using adhesive in this case. The reduced section may have threaded holes through the warhead case wall that provide for the attachment to the projectile coupler 666B with screws.

The nose cover 693 enhances the aerodynamics of the projectile 660 and protects the soft metal SCJ liner 602. In some embodiments, the nose cover 693 is formed of a frangible material. In some embodiments, the nose cover 693 is formed of a low-density material (in some embodiments, a plastic) that is intended to minimally impede the metal jet produced from the liner 602 by warhead detonation.

In some embodiments, the wall thickness T3 (FIG. 24) of the nose cover 693 is in the range of from 0.020 inch to 0.040 inch.

In some embodiments, the front profile of the nose cover 693 is hemispherical. In some embodiments, the front profile of the nose cover 693 is ogive. Typically, the nose cover 693 will span the full diameter of the warhead case.

In some embodiments, the length of the nose cover 693 is in the range of from 0.5 inch to 2.5 inches.

The nose cover 693 may have integrated threads for mating to the warhead case 691. The nose cover 693 may have a cylindrical extension at its base that overlaps the warhead case is attached with adhesive between the overlapping surfaces.

The onboard fuze system 695 is configured to actuate (e.g., detonate or ignite) the energetic payload 694. In some embodiments, the fuze system 695 includes a safe-arm-fire (SAF) device and one or more sensors that provide signals to initiate the energetic payload. The SAF device may be either electronic or mechanical in nature. The SAF device receives sensor input from the target proximity sensor(s) 677, and may receive inputs from other sensors. In some embodiments, the sensor(s) include a target proximity sensor 677 specifically for a “height-of-burst” (HOB) type operation, where the sensor senses proximity, to the ground or targeting surfaces, and sends a trigger to the SAF device when some predetermined criteria is met. HOB sensors typically utilize radar, laser distance measuring, or optical means such as stereo vision. In some embodiments, the sensor(s) include one or more of an accelerometer, a gyro, a pressure sensor, a mechanical closure or opening of an electronic circuit, a timer, each of which may be integral to the SAF device. The SAF device can ensure some minimum safe separation of the projectile 660 from the point of launch by processing sensor signals and applying conditional logic to arm the subsystem for fire accordingly. Once armed, the SAF device’s sensor inputs are processed to determine the timing or position of the projectile 660 for when/where the SAF device initiates the energetic (e.g., explosive) payload.

The booster 697 may be included in the warhead 690 as part of the explosive firing train. The booster 697 is detonable by the initiator 695B and is provided when the HE main charge 694 cannot be reliably initiated by the initiator 695B. A booster would be used if the main charge were PBXN-110, for example. A booster may not be used if the main charge were a high-density press-cast composition, such as PBXN-9, for example. An example of the booster composition is PBXN-5 (95% HMX, 1.78 g/cc nominal density), which is a press-cast polymer bonded high explosive. In some embodiments, the booster is omitted. In some embodiments, the initiator 695B is a LEEFI initiator.

Operations, methods of use and applications of the projectile 660 will now be described. As used herein, “fire the SCJ” or the like means to detonate the high explosive 694 and thereby cause the SCJ 601 to produce the SCJ stream 602J.

In use, the projectile 660 is launched from a projectile delivery system of a weaponized aerial vehicle (e.g., the projectile delivery system 100 and the weaponized aerial vehicle 101) and guided to a target T as disclosed herein with regard to the projectile 160. At a desired location relative to the target, the fuze system 695 detonates the high explosive 694. The SCJ liner 602 is compressed by the detonation shock wave from the detonation of the high explosive 694 and projected in the forward direction FD toward and against the target T.

Figure 27:
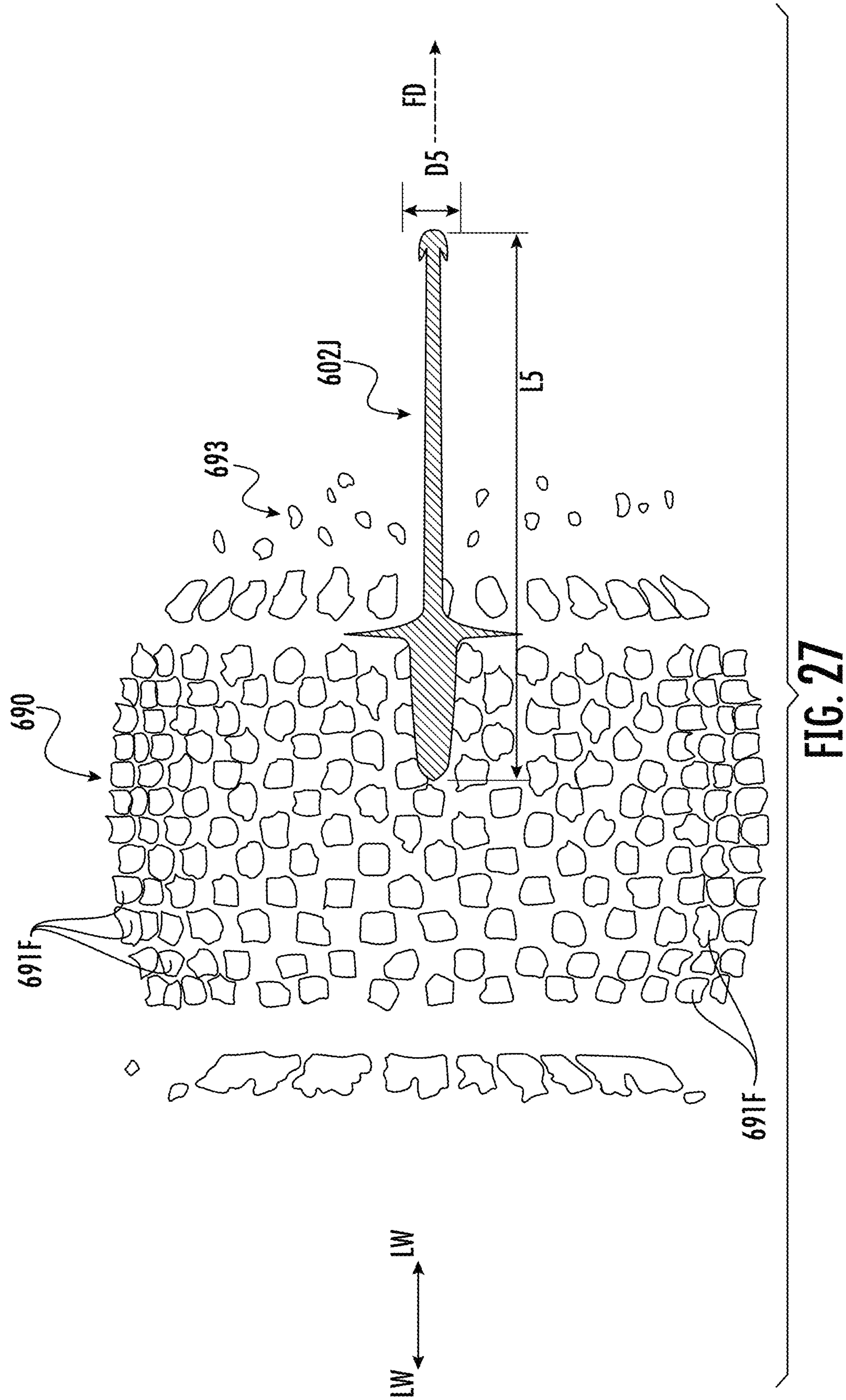
FIG. 27 is a schematic view illustrating the projectile of FIG. 22 in an exploded state and an SCJ stream generate by the explosion.

More particularly and with reference to FIG. 27, the SCJ liner 602 is thereby converted to a high-velocity metal jet or SCJ stream 602J that projects out along the warhead cylindrical axis LW-LW in the forward direction FD. The liner 602 becomes a metal stream 602J during rapid axi-symmetric collapse of the liner 602 by a high explosive detonation shock wave that propagates or progresses from the vertex 606V to the base 606B of the liner 602. The initial formed metal stream 602J will be highly elongated and, during its coherent phase, will have a coherent stream length L5. The coherent stream length L5 is the length of the portion of the stream 602J that is continuous (which may include the entire stream 602J). In some embodiments, the coherent stream length L5 is at least five times the outer diameter D6 (FIG. 24) of the main charge 694. In the coherent phase, the metal stream 602J will be continuous and have a coherent stream length L5 ranging from 5 times its diameter D5 to 25 times its diameter D5. In some embodiments, the material velocity of the stream 602J at the leading tip of the stream 602J exceeds 6 kilometers per second.

In some embodiments, the time period between the fuse system 695 actuating or firing the initiator 695B and the complete formation of the stream 602J is less than 2 milliseconds.

The stream 602J will penetrate or break through the nose cover 693. The detonated charge 694 will also break apart the warhead case 691. If the warhead case 691 is a high-density material, fragmenting-type case, the explosion will cause high kinetic energy fragments to project generally radially from the warhead 690 to damage surrounding target(s). If the warhead case 691 is a low-density material, frangible-type case, the explosion will cause the case 691 to break apart, typically into low-energy debris without projecting high kinetic energy fragments into the surrounding area.

In some embodiments, the target T includes an armor system and the metal stream 602J is used to perforate a high strength material or materials of the armor system. These materials may include steel, ceramics, aluminums, and glass. Penetration into these materials is caused by the high hydrodynamic shock pressures produced by the speed and dense nature of the metal stream. A result of this hydrodynamic shock, the target material flows moving in the opposite direction of, and near parallel to, the impacting jet 602J. These target material flows form an annulus-like outflow around incoming metal jet 602J. The continuous slender incoming jet 602J loads the target material in a continuous manner that drives the region of hydrodynamic shock into the thickness of the target material, essentially tunneling into the target, with the result being exceptional deep penetrations.

In some embodiments, the target T includes a high explosive (HE) charge and the metal stream 602J is used to defeat the HE charge. The target may be, for example, a munition or mine. The action of the metal stream 602J on the targeted HE produces either a shock-to-detonation or a high-rate deposition of energy that produces a deflagration response in the targeted HE. Either reaction will completely consume the target HE charge. The high kinetic energy of the metal stream 602J is capable of initiating reaction of a targeted HE charge after perforating the heavy metal cases of munitions such as general-purpose bombs.

The SCJ 601 delivered by projectile-guided drop can be effective against a range of targets, including light armored vehicles such as personnel carriers, up-armored integrate air defense systems, timber bunkers, and commercial concrete construction. The SCJ 601 may be used to penetrate and catastrophically damage electrical infrastructure such as substation transformers and switching hardware.

In some embodiments, the target T is a vehicle. The SCJ 601 is used to disable the vehicle by penetrating an engine bay of the vehicle and producing catastrophic damage to an engine and/or transmission of the vehicle. In some embodiments, a projectile 660 is used for this purpose having a frangible, low density material warhead case 691 as discussed above. With the targeting capability of the projectile 660, the projectile 660 with frangible case 691 can immobilize a commercial vehicle while posing little risk to the vehicle occupants.

According to some embodiments, the weapon system 10 and projectile delivery system 100 incorporating the SCJ-equipped projectile 660 are used as follows to more effectively attack a target T by employing the projectile's onboard target proximity sensor(s) 677. The base module 110, serving as a guidance station, is used to remotely automatically control the onboard steering system 180 of the projectile 660 using the projectile control system 146 of the base module 110 to adjust a trajectory of the falling projectile 660 to steer the projectile 660 to the target T as described herein with regard to the projectile 160. The SCJ 601 achieves its highest performance when the SCJ is fired (i.e., the main charge 694 is detonated and the stream 602J is projected) when the projectile 660 is positioned relative to the target T with a spatial gap or stand-off L8 (FIG. 30) between the unexploded warhead 690 and the target T. If the SCJ is fired at a distance from the target T that is greater than a prescribed stand-off range, the stream 602J may become incoherent due to material velocity gradients along the length of the stream. If the SCJ 601 is fired at a distance from the target T that is less than a prescribed stand-off range, the stream 602J may not have time to fully form.

To increase the likelihood that the SCJ 601 is fired at the appropriate time to achieve the desired stand-off at the time of SCJ firing, the target proximity sensor(s) 677 and the fuze system 695 are used to determine when to detonate the main charge 694. As the projectile 660 approaches the target T in the terminal phase of flight (e.g., within 10 meters above the ground or target T), the target proximity sensor 677 accurately measures the distance to the target T and signals the fuze controller 695A. In response, the fuze controller 695A actuates the initiator 695B to detonate the main charge 694 (e.g., via the booster 697) when the projectile 660 is located relative to the target T with a stand-off L8 within the prescribed stand-off range. In some embodiments, the fuze system 695 can sense the distance to impact and initiate the main charge 694 in 2 milliseconds or less. The projectile 660 may use radio-frequency sensors or optical sensors as the target proximity sensors 677 to accurately measure the distance to the target in the terminal phase of flight.

In some embodiments, the prescribed stand-off range is 5 to 10 times the charge diameter D6. In some embodiments, the prescribed stand-off range is in the range of from about 15 cm to 60 cm.

If the warhead case 691 is a fragmenting-type case, the fragments 691F are projected radially before the projectile 660 strikes the target T. As a result, projectile 660 provides a dual mode damage effect.

According to some embodiments, the weapon system 10 and projectile delivery system 100 incorporating the SCJ-equipped projectile 660 are used as follows to more effectively attack a target T by employing the projectile's onboard projectile stabilization system 673. As described herein, the projectile 660 is dropped from an aerial vehicle 20 and is driven toward the target T by gravity. The base module 110, serving as a guidance station, is used to remotely (and, in some embodiments, automatically) control the onboard steering system 180 of the projectile 660 using the projectile control system 146 of the base module 110 to adjust a trajectory of the falling projectile 660 to steer the projectile 660 to the target T as described herein with regard to the projectile 160.

To be effective, the SCJ 601 should fire its SCJ stream 602J directly at the target T. The SCJ's effectiveness is maximized when obliquity is minimized between the impacting SCJ metal jet 602J and the target surface impacted. During its gravity driven flight toward the target T, the projectile 660 tends to point its nose, and hence the warhead SCJ effect, at the target T. However, other factors (e.g., errors in the guidance from the base module 110, shifts in the location of the target T, and/or environmental influences such as wind force) may cause the projectile trajectory to deviate from the target T in or near the terminal phase of flight. Also, the attitude of the projectile 660 relative to the target T may be improper (e.g., not normal to) the target surface in the terminal phase of flight.

The projectile delivery system 100 addresses these potential problems using the onboard projectile stabilization system 673. As the projectile 660 nears and approaches the target T in or near the terminal phase of flight, the target proximity sensor(s) 677 detect the location of the target T. Additionally, the projectile status sensor(s) 676 detect the state or position of the projectile 660. The projectile controller 674 uses this data from the target proximity sensor(s) 677 and the projectile status sensor(s) 676 to estimate a projected target miss distance and determine whether the attitude of the projectile body 666 should be corrected.

Based on the determination, the projectile controller 674 uses the projectile stabilization controller 675 and the onboard steering system 180 to correct or adjust the attitude or orientation of the projectile body 666 to point the SCJ 601 at the target T in the projectile's terminal phase of flight.

In some embodiments, the onboard projectile stabilization system 673 is operative to automatically control the onboard steering system 180 to correct an orientation of the projectile 660 with respect to the target as the projectile approaches the target T by: using the sensor input from the target proximity sensor 677, estimating a target T location relative to the projectile 660; and, using the onboard steering system 180, rotating the projectile 660 so that the SCJ stream 602J is directed at the target T.

In this way, the projectile 660 can automatically adjust the flight body attitude or orientation relative to the target to minimize the deviation of the warhead axis LW-LW from normal with the target surface in the terminal phase of flight. In some embodiments, this corrective action executed by the projectile controller 674 and the onboard projectile stabilization system 673 is executed independently of and without input from the base module 110 or any other remote controller.

Figure 28:
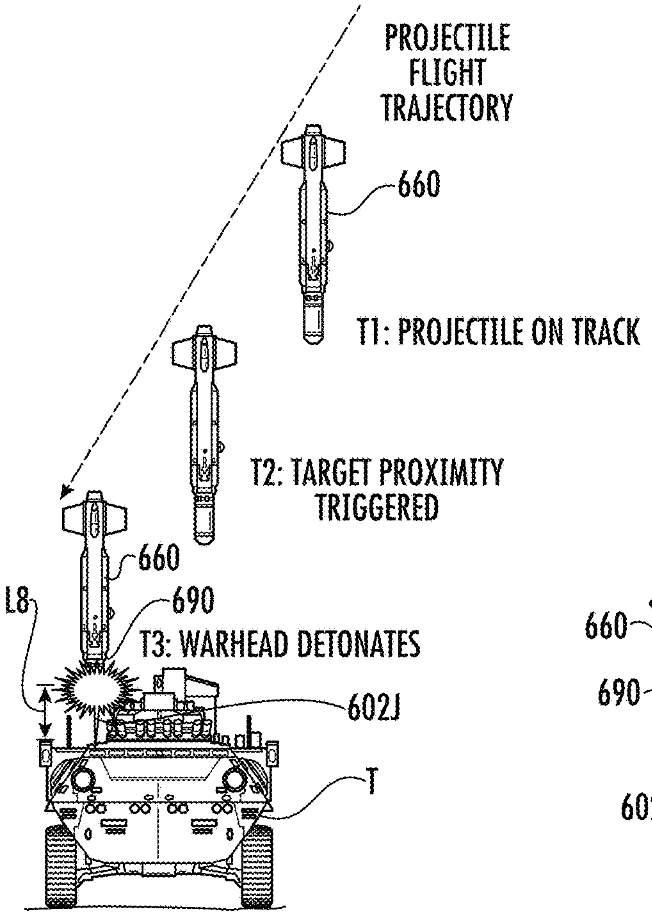
FIGS. 28-30 are schematic views illustrating deployments of the projectile of FIG. 22 against a target.
Figure 29:
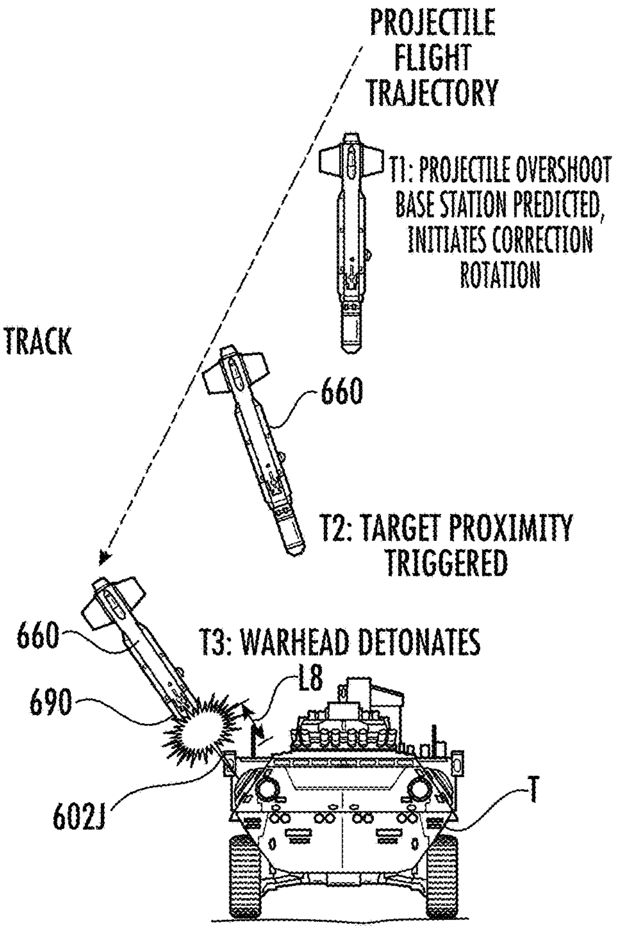
Figure 30:
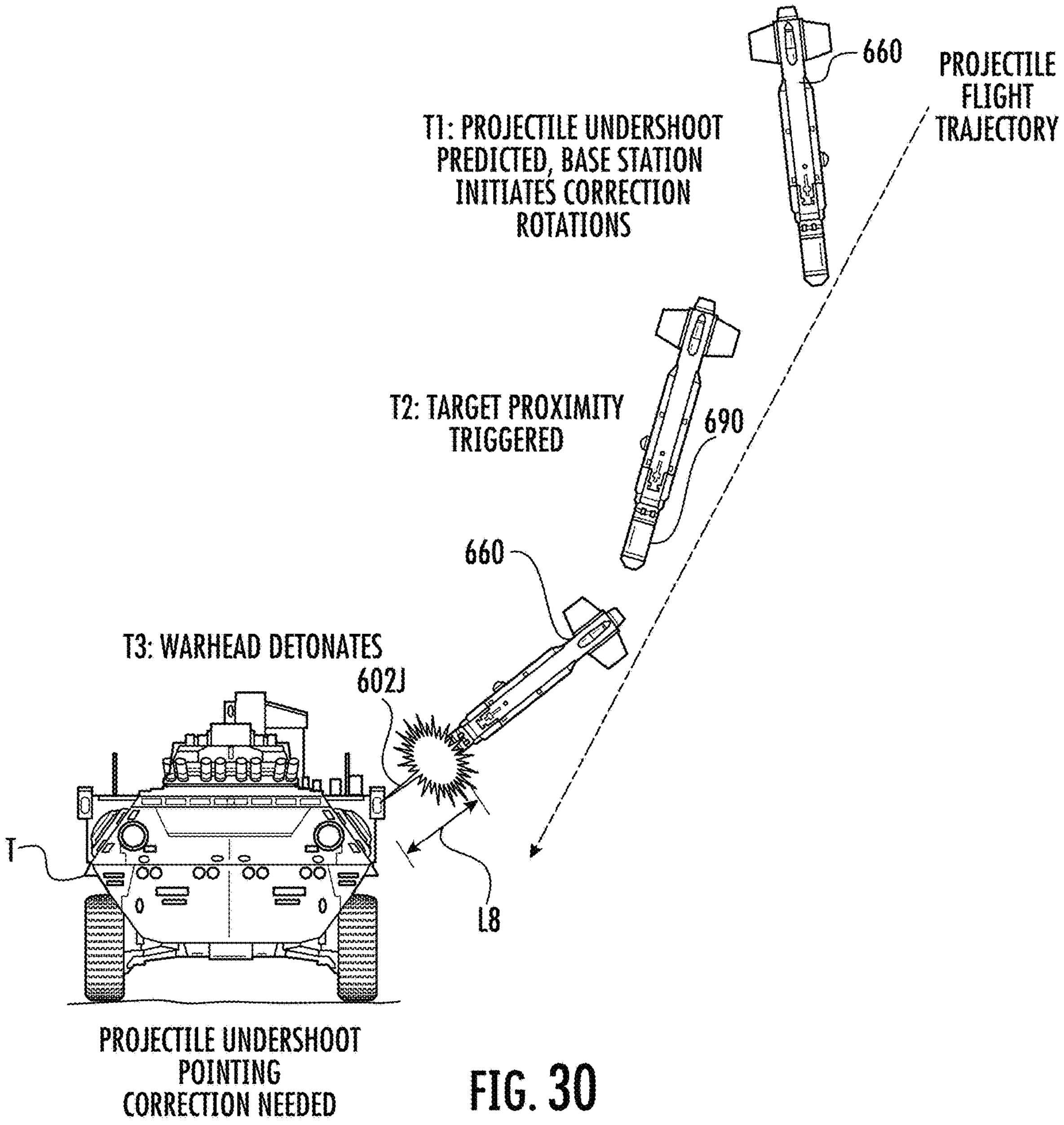

FIGS. 28-30 schematically illustrate operations of the weapon system 10 wherein the onboard projectile stabilization system 673 operates as described above to properly orient the projectile 660 relative to the surface of the target T. In FIGS. 28-30, the sizes of the projectile 660 and the SCJ stream 602J are exaggerated for the purpose of explanation.

FIG. 28 illustrates a deployment scenario in which correction of the projectile's orientation using the onboard projectile stabilization system 673 is not needed. In this scenario, the flight path of the projectile 660 pursuant to the guidance and command of the base module 110 brings the projectile 660 adjacent the target T with the projectile orientation substantially normal to the target T when the prescribed stand-off is achieved at time T3. At time T1, the projectile 660 is on the track determined by the base module 110. At time T2, the target proximity sensor 677 is triggered to detect the location of the target T. The projectile controller 674 determines, based on the input from the target proximity sensor 677, that correction is not needed. At time T3, the warhead detonates to fire the SCJ 601. Because the projectile 660 is pointed at the target T without intervention, the onboard projectile stabilization system 673 is not used to correct the projectile orientation between time T2 and time T3. The SCJ stream 602J is directed at and onto the target T.

FIG. 29 illustrates a deployment scenario in which correction of the projectile's orientation using the onboard projectile stabilization system 673 is needed. In this scenario, the flight path of the projectile 660 pursuant to the guidance and command of the base module 110 will cause the projectile 660 to overshoot the target T without intervention. At time T1, the projectile 660 is on the track determined by the base module 110. At time T2, the target proximity sensor 677 is triggered to detect the location of the target T. The projectile controller 674 determines, based on the input from the target proximity sensor 677, that projectile orientation correction is needed. The projectile controller 674 then uses the onboard projectile stabilization system 673 to reorient the projectile 660 relative to the target T such that the projectile 660 is pointed at the target T when the prescribed stand-off is achieved at time T3. The SCJ stream 602J is directed at and onto the target T.

FIG. 30 illustrates another deployment scenario in which correction of the projectile's orientation using the onboard projectile stabilization system 673 is needed. In this scenario, the flight path of the projectile 660 pursuant to the guidance and command of the base module 110 will cause the projectile 660 to undershoot the target T without intervention. At time T1, the projectile 660 is on the track determined by the base module 110. At time T2, the target proximity sensor 677 is triggered to detect the location of the target T. The projectile controller 674 determines, based on the input from the target proximity sensor 677, that projectile orientation correction is needed. The projectile controller 674 then uses the onboard projectile stabilization system 673 to reorient the projectile 660 relative to the target T such that the projectile 660 is pointed at the target T when the prescribed stand-off is achieved at time T3. The SCJ stream 602J is directed at and onto the target T.

According to further embodiments, a projectile as described herein (e.g., the projectile 660) may include a shaped charge of a different type in place of the SCJ 601. In some embodiments, the alternative shape charge is an EFP.

Figure 31:
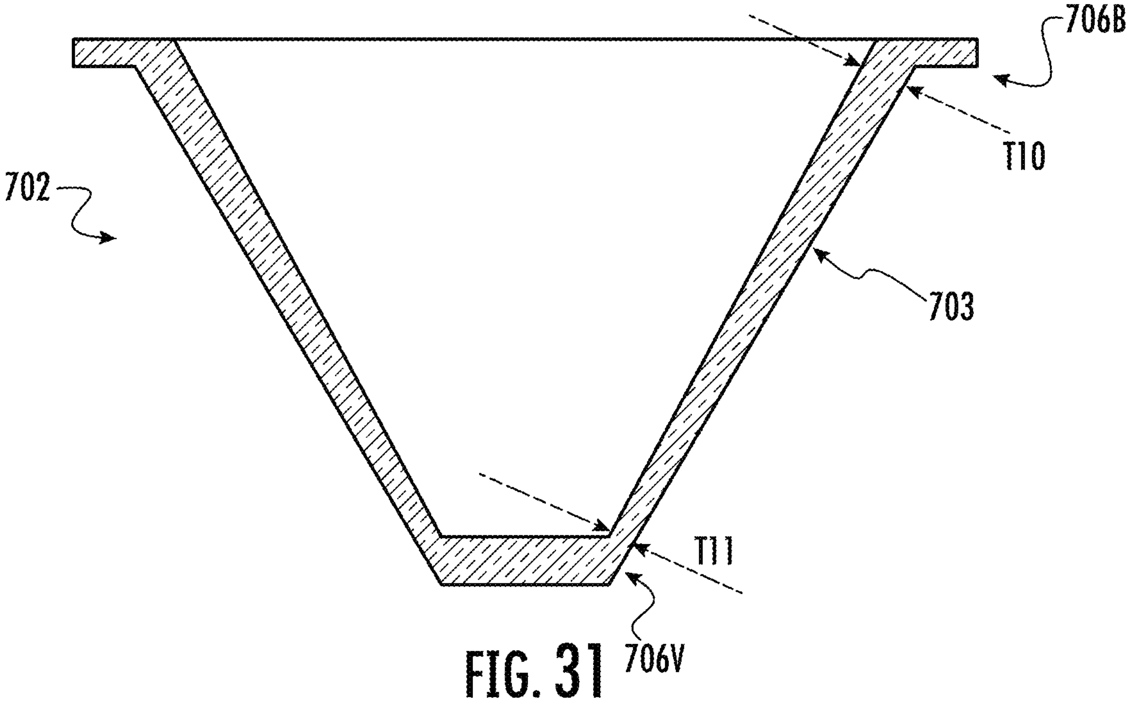
FIG. 31 is cross-sectional view of an alternative SCJ liner for use in the projectile of FIG. 22.

With reference to FIG. 31, an SCJ liner 702 according to further embodiments is shown therein. In some embodiments, the SCJ liner 702 is used in the SCJ liner 601 and the projectile 660 in place of the SCJ liner 602. The SCJ liner 702 differs from the SCJ liner 601 in that the conical, axially extending sidewall 703 forming the body of the SCJ liner 702 has a nonuniform thickness along its length. In some embodiments (e.g., as illustrated), the thickness of the sidewall 703 tapers or reduces in the direction from the base 706B to the vertex 706V from a first thickness T10 to a lesser thickness T11. In some embodiments, the wall thickness is reduced by at least 30 percent from the base 706B to the vertex 706V. For example, the thickness at the base of the cone may be 0.080 inch and 0.040 inch near the vertex 706V.

Figure 32C:
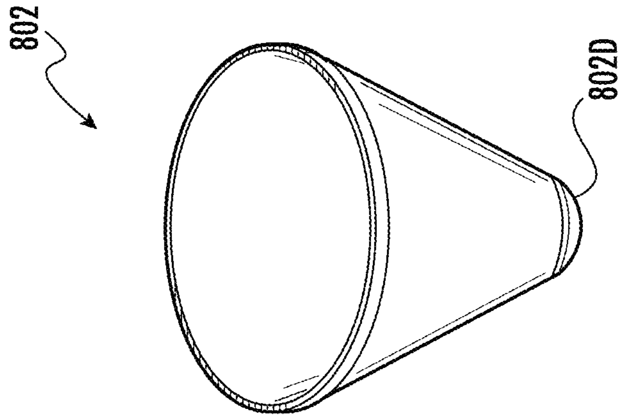
FIG. 32C is a perspective view of the SCJ liner of FIG. 32A.
Figure 32B:
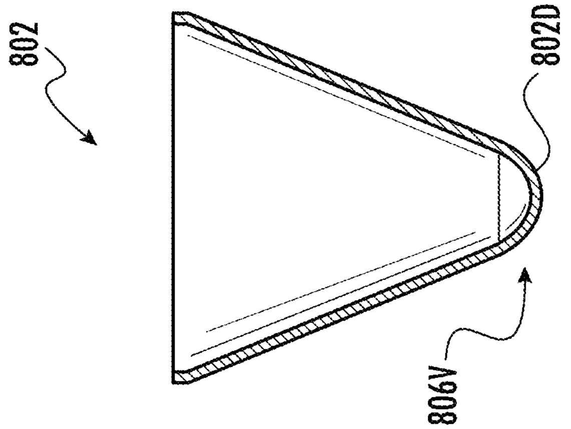
FIG. 32B is a cross-sectional view of the SCJ liner of FIG. 32A taken along the line 32B-32B of FIG. 32A.
Figure 32A:
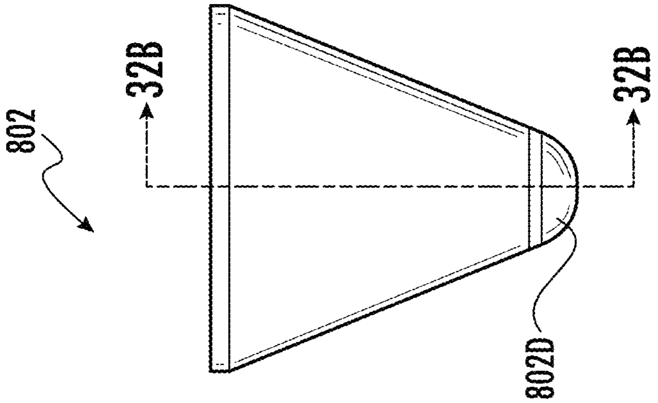
FIG. 32A is side view of an alternative SCJ liner for use in the projectile of FIG. 22.

With reference to FIGS. 32A-32C, an SCJ liner 802 according to further embodiments is shown therein. In some embodiments, the SCJ liner 802 is used in the SCJ liner 601 and the projectile 660 in place of the SCJ liner 602. The SCJ liner 802 differs from the SCJ liner 601 in that SCJ liner 802 includes a domed or hemispherical end wall 802D at its vertex 806V in place of the flat or planar end wall 602D of the SCJ liner 602.

Figure 33A:
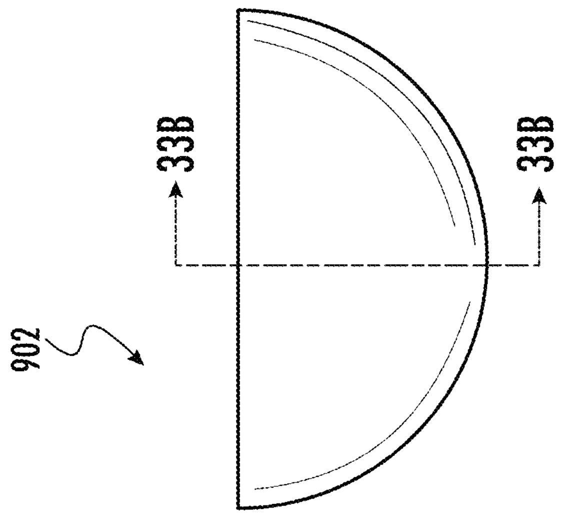
FIG. 33A is side view of an alternative SCJ liner for use in the projectile of FIG. 22.
Figure 33B:
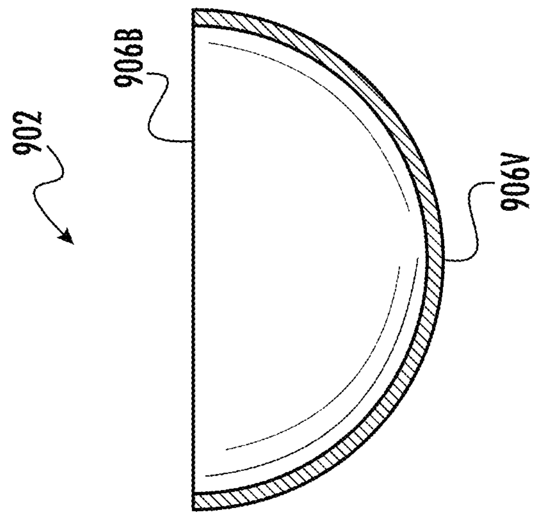
FIG. 33B is a cross-sectional view of the SCJ liner of FIG. 33A taken along the line 33B-33B of FIG. 33A.
Figure 33C:
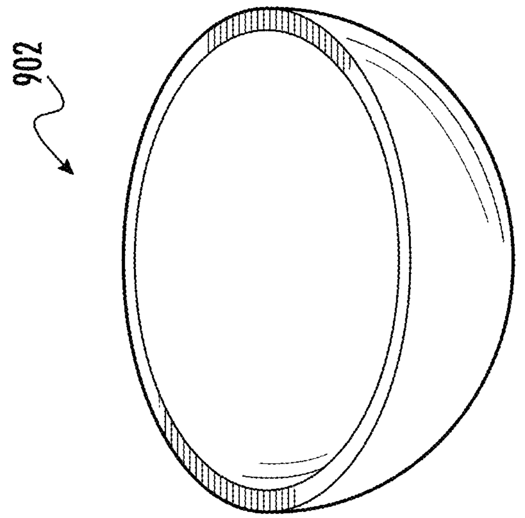
FIG. 33C is a perspective view of the SCJ liner of FIG. 33A.

With reference to FIGS. 33A-33C, an SCJ liner 902 according to further embodiments is shown therein. In some embodiments, the SCJ liner 902 is used in the SCJ liner 601 and the projectile 660 in place of the SCJ liner 602. The SCJ liner 902 differs from the SCJ liner 601 in that SCJ liner 902 is hemispherical from its base 906B to its apex 906V.

Figures 34A, 34B, 34C:
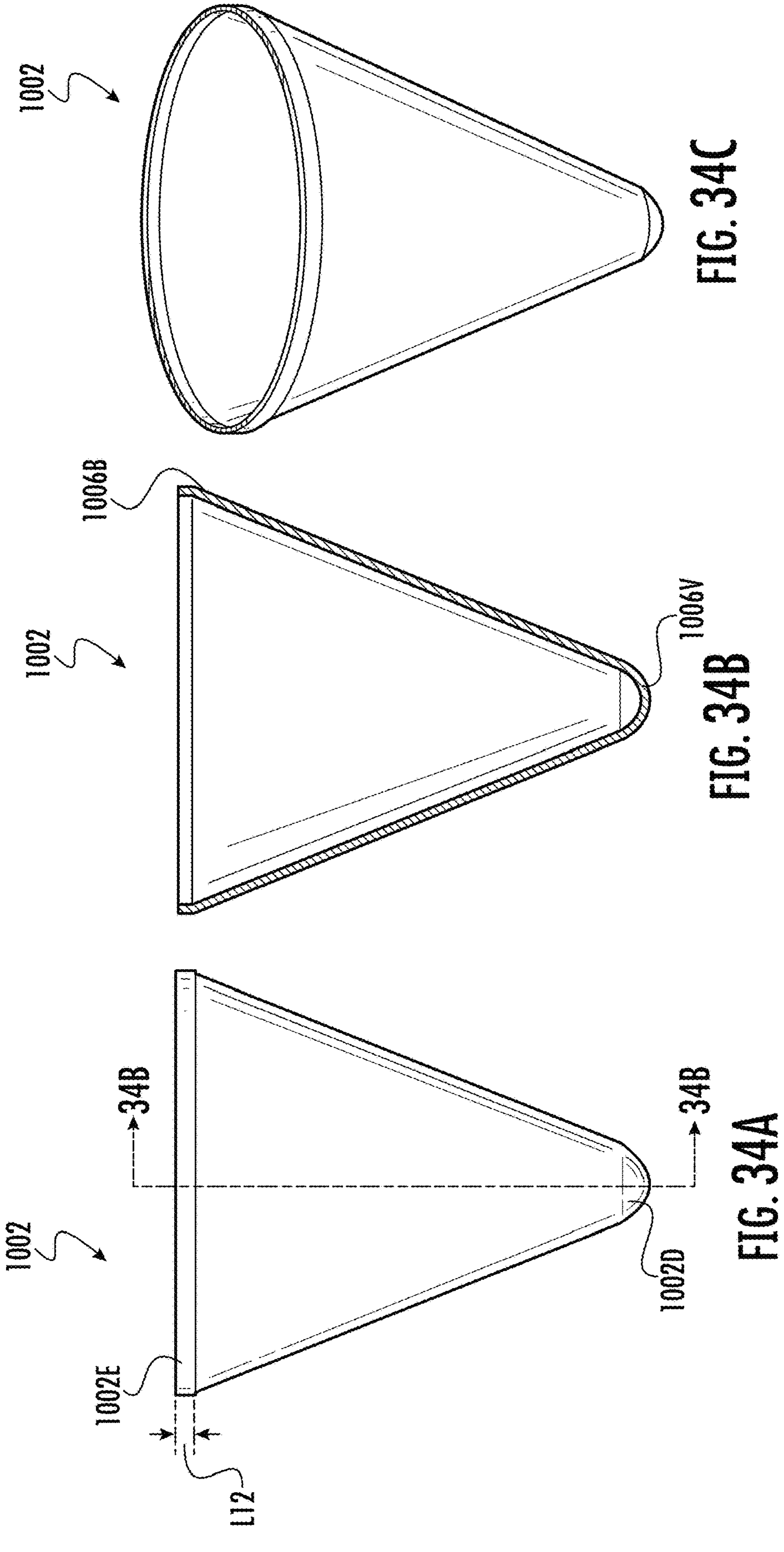
FIG. 34A is side view of an alternative SCJ liner for use in the projectile of FIG. 22.
FIG. 34B is a cross-sectional view of the SCJ liner of FIG. 34A taken along the line 34B-34B of FIG. 34A.
FIG. 34C is a perspective view of the SCJ liner of FIG. 34A.

With reference to FIGS. 34A-34C, an SCJ liner 1002 according to further embodiments is shown therein. In some embodiments, the SCJ liner 1002 is used in the SCJ liner 601 and the projectile 660 in place of the SCJ liner 602. The SCJ liner 1002 differs from the SCJ liner 601 in that SCJ liner 1002 includes a domed or hemispherical end wall 1002D at its vertex 1006V, and further includes an integral cylindrical extension wall 1002E projecting forwardly from the liner's base 1006B. In some embodiments, the warhead case 691 and the cylindrical extension wall 1002E are thermally shrink fitted to one another to secure the SCJ liner 1002 in the warhead 690. In some embodiments, the cylindrical extension wall 1002E is bonded to the warhead case 691 using an adhesive to secure the SCJ liner 1002 in the warhead 690. In some embodiments, the cylindrical extension wall 1002E has an axial length L12 in the range of from about 2 mm to 5 mm.

In the above description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages, such as MATLAB. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (Saas).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims, therefore, are to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed:

1. A weaponized aerial vehicle comprising:
- an aerial vehicle; and
- a projectile delivery system mounted on the aerial vehicle for flight therewith, the projectile delivery system including:
  - a projectile including:
    - a projectile body;
    - an onboard steering system including:
      - a steering mechanism operable to change an attitude, orientation, and/or direction of flight of the projectile; and
      - a steering actuator operable to control the steering mechanism; and
    - an energetic payload; and
  - a base system including:
    - a projectile holder securing the projectile to the aerial vehicle and configured to selectively release the projectile;
    - a target tracking system; and
    - a projectile guidance system including a projectile tracking system and a projectile control system;
- wherein the base system is configured to:
  - release the projectile from the projectile holder such that the projectile is driven toward a target by gravity;
  - track the target using the target tracking system;
  - track the released projectile using the projectile tracking system; and
  - automatically control the onboard steering system of the projectile using the projectile control system to adjust a trajectory of the falling projectile to steer the projectile to the target.

2. The weaponized aerial vehicle of claim 1 wherein the energetic payload is a high explosive.

3. The weaponized aerial vehicle of claim 1 wherein the energetic payload is a combustible material, and the projectile is configured to ignite the combustible material to generate a flash-bang effect.

4. The weaponized aerial vehicle of claim 1 wherein the energetic payload is an incendiary material, and the projectile is configured to ignite the incendiary material to generate a pyrophoric reaction.

5. The weaponized aerial vehicle of claim 1 wherein:
- the energetic payload is a high explosive;
- the projectile includes a fragment projection warhead including a fragmentation case or preformed fragments; and
- the high explosive is configured to forcibly project fragments from the fragment projection warhead when the high explosive is detonated.

6. The weaponized aerial vehicle of claim 1 wherein:
- the energetic payload is a high explosive; and
- the projectile includes a shaped charge including the high explosive and a shaped charge liner.

7. The weaponized aerial vehicle of claim 6 wherein:
- the projectile further includes a fragmentation case or preformed fragments; and
- the high explosive is configured to forcibly project fragments from the fragment projection warhead when the high explosive is detonated.

8. The weaponized aerial vehicle of claim 6 wherein:
- the projectile further includes a frangible case containing the high explosive; and
- the high explosive is configured to break the frangible case without generating lethal fragments when the high explosive is detonated.

9. The weaponized aerial vehicle of claim 6 including a frangible nose cover mounted in front of the shaped charge.

10. The weaponized aerial vehicle of claim 6 wherein the shaped charge is a shaped charge jet (SCJ) and the shaped charge liner is an SCJ liner.

11. The weaponized aerial vehicle of claim 10 wherein the SCJ liner is generally conical.

12. The weaponized aerial vehicle of claim 11 wherein the SCJ liner has a flat end wall at its vertex.

13. The weaponized aerial vehicle of claim 11 wherein the SCJ liner has a hemispherical end wall at its vertex.

14. The weaponized aerial vehicle of claim 11 wherein the SCJ liner includes a sidewall having a tapered thickness.

15. The weaponized aerial vehicle of claim 11 wherein the SCJ liner includes a cylindrical extension wall extending forwardly from the base of the cone.

16. The weaponized aerial vehicle of claim 10 wherein the SCJ liner is generally hemispherical.

17. The weaponized aerial vehicle of claim 6 wherein the shaped charge is an explosive formed penetrator (EFP) and the shaped charge liner is an EFP liner.

18. The weaponized aerial vehicle of claim 6 wherein the projectile is configured to detonate the high explosive to fire the shaped charge when the projectile is at a stand-off distance from the target within a prescribed stand-off distance range.

19. The weaponized aerial vehicle of claim 18 wherein the projectile includes:
- a target proximity sensor configured to detect a distance between the projectile and the target; and
- a fuze system operative to detonate the high explosive to fire the shaped charge based on data from the target proximity sensor.

20. The weaponized aerial vehicle of claim 18 wherein the prescribed stand-off distance range is in the range of from about 15 cm to 60 cm.

21. The weaponized aerial vehicle of claim 6 wherein:
- the projectile includes:
  - an onboard projectile stabilization system; and an onboard target sensor; and the onboard projectile stabilization system is operative to automatically control the onboard steering system to correct an orientation of the projectile with respect to the target as the projectile approaches the target.

22. The weaponized aerial vehicle of claim 1 wherein the projectile is configured to detonate the energetic payload after the projectile penetrates the target.

23. The weaponized aerial vehicle of claim 1 wherein the released projectile is driven downward only by gravity.

24. The weaponized aerial vehicle of claim 1 wherein the projectile does not include or carry an onboard propulsion mechanism.

25. The weaponized aerial vehicle of claim 1 wherein the projectile does not include or carry an onboard target tracking system.

26. The weaponized aerial vehicle of claim 1 wherein the projectile body includes a polymeric component and a metal nose.

27. The weaponized aerial vehicle of claim 1 wherein the projectile steering mechanism includes an adjustable aerodynamic control surface.

28. The weaponized aerial vehicle of claim 27 wherein the adjustable aerodynamic control surface is a movable fin or canard.

29. The weaponized aerial vehicle of claim 27 wherein the projectile steering actuator includes a motor operable to move the aerodynamic control surface.

30. The weaponized aerial vehicle of claim 1 wherein the projectile delivery system controls the flight of the released projectile using one-way communication between the base system and the projectile, wherein:

the base system sends steering commands to the projectile; and the projectile does not send signals to the base system.

31. The weaponized aerial vehicle of claim 1 wherein the projectile delivery system controls the flight of the released projectile using two-way communication between the base system and the projectile, wherein:

the base system sends steering commands to the projectile; and the projectile sends projectile status data to the base system to incorporate into projectile tracking and guidance processing by the base system.

32. The weaponized aerial vehicle of claim 31 wherein the projectile status data includes at least one of: a magnetometer-based heading reading; an airspeed of the projectile; an altitude of the projectile; an attitude of the projectile; an orientation of the projectile; and a rate of rotation of the projectile about each of a roll axis, a pitch axis, and a yaw axis.

33. The weaponized aerial vehicle of claim 31 wherein the projectile includes an onboard projectile state sensor that acquires the projectile status data instantaneously.

34. The weaponized aerial vehicle of claim 1 configured such that:

the aerial vehicle is automatically placed in a tracking/guidance mode when the projectile is released and in flight; and in the tracking/guidance mode, flight of the aerial vehicle is controlled to optimize guidance of the projectile.

35. The weaponized aerial vehicle of claim 34 wherein:

the projectile tracking system includes a camera to track the inflight projectile; and the camera is secured to the aerial vehicle without a gimbal.

36. The weaponized aerial vehicle of claim 1 wherein the projectile delivery system is configured to:

receive a target designation from an operator; and thereafter automatically execute the tracking of the target and the tracking and guidance of the projectile using the base system onboard the aerial vehicle.

37. The weaponized aerial vehicle of claim 1 wherein the projectile delivery system is configured to:

receive a target designation from an operator;

receive a designation of an abort zone from the operator; and guide the released projectile to the abort zone in response to a command to abort the attack.

38. The weaponized aerial vehicle of claim 1 wherein:

the base system includes a camera to be mounted on the aerial vehicle; and the target tracking system is configured to:

acquire image data from the camera; and track the target using computer vision.

39. The weaponized aerial vehicle of claim 1 wherein the projectile does not include or carry an onboard projectile guidance system.

40. The weaponized aerial vehicle of claim 1 wherein the projectile does not include or carry a GPS signal receiver.

41. The weaponized aerial vehicle of claim 1 wherein the projectile delivery system includes a plurality of the projectiles.

42. The weaponized aerial vehicle of claim 41 wherein the base system is operable to release a plurality of the projectiles in a salvo directed at the target.

43. The weaponized aerial vehicle of claim 1 wherein the projectile body is elongate.

44. The weaponized aerial vehicle of claim 43 wherein the projectile body has a length: width ratio in the range of from about 8 to 15.

45. The weaponized aerial vehicle of claim 43 wherein the projectile body has a length in the range of from about 10 to 16 inches long, and a mass in the range of from about 70 to 350 grams without a payload.

46. The weaponized aerial vehicle of claim 43 wherein the projectile body has a leading end that is tapered to pierce the target.

47. The weaponized aerial vehicle of claim 1 wherein:

the projectile includes a self-designation feature; and the projectile tracking system uses the self-designation feature to track the released projectile in flight.

48. The weaponized aerial vehicle of claim 47 wherein the self-designation feature is an infrared light emitter, a blue light (400 to 480 nm) emitter, or a UV (240 to 400 nm) emitter.

49. The weaponized aerial vehicle of claim 1 wherein the projectile delivery system is configured to:

receive a target designation from an operator;

receive a designation of a keep out zone from the operator; and prevent the projectile from landing in the keep out zone.

50. The weaponized aerial vehicle of claim 49 wherein the projectile guidance system is configured to:

receive a bounding box designation from an operator; and control the onboard steering system of the projectile to adjust a trajectory of the falling projectile to steer the projectile into a space designated by the bounding box.

51. The weaponized aerial vehicle of claim 1 wherein the base system is configured to communicate with a remote operator terminal to report projectile tracking data relative to a location of the target and/or a designated zone.

52. The weaponized aerial vehicle of claim 51 wherein the base system is configured to communicate with a remote operator terminal to report projectile tracking data relative to a location of the target and relative to at least one of a designated abort zone and a designated keep out zone.

53. A method for damaging a target, the method comprising:
- providing a weaponized aerial vehicle including:
  - an aerial vehicle; and
  - a projectile delivery system mounted on the aerial vehicle for flight therewith, the projectile delivery system including:
    - a projectile including:
      - a projectile body;
      - an onboard steering system including:
        - a steering mechanism operable to change an attitude, orientation, and/or direction of flight of the projectile; and
      - a steering actuator operable to control the steering mechanism; and
      - an energetic payload; and
    - a base system including:
      - a projectile holder securing the projectile to the aerial vehicle and configured to selectively release the projectile;
      - a target tracking system; and
      - a projectile guidance system including a projectile tracking system and a projectile control system; and
- using the base system to:
  - release the projectile from the projectile holder such that the projectile is driven toward a target by gravity;
  - track the target using the target tracking system;
  - track the released projectile using the projectile tracking system; and
  - automatically control the onboard steering system of the projectile using the projectile control system to adjust a trajectory of the falling projectile to steer the projectile to the target.

54. A weaponized aerial vehicle system comprising:
- an aerial vehicle;
- a projectile releasably mounted on the aerial vehicle for flight therewith, the projectile including:
  - a projectile body;
  - an onboard steering system including:
    - a steering mechanism operable to change an attitude, orientation, and/or direction of flight of the projectile; and
    - a steering actuator operable to control the steering mechanism;
  - an onboard projectile stabilization system; and
  - an onboard target proximity sensor; and
- a guidance station including a projectile control system;
- wherein the projectile is releasably from the aerial vehicle such that the projectile is driven toward a target by gravity;
- wherein the guidance station is configured to remotely automatically control the onboard steering system of the projectile using the projectile control system to adjust a trajectory of the falling projectile to steer the projectile to the target; and
- the onboard projectile stabilization system is operative, using sensor input from the target proximity sensor, to automatically control the onboard steering system to correct an orientation of the projectile with respect to the target as the projectile approaches the target.

55. The weaponized aerial vehicle system of claim 54 wherein:
- the projectile includes a shaped jet charge (SCJ) configured to generate an SCJ stream;
- the onboard projectile stabilization system is operative to automatically control the onboard steering system to correct an orientation of the projectile with respect to the target as the projectile approaches the target by:
  - using the sensor input from the target proximity sensor, estimating a target location relative to the projectile; and
  - using the onboard steering system, rotating the projectile so that the SCJ stream is directed at the target.

56. A method for damaging a target, the method comprising:
- providing a projectile releasably mounted on an aerial vehicle for flight with the aerial vehicle, the projectile including:
  - a projectile body;
  - an onboard steering system including:
    - a steering mechanism operable to change an attitude, orientation, and/or direction of flight of the projectile; and
    - a steering actuator operable to control the steering mechanism;
  - an onboard projectile stabilization system; and
  - an onboard target proximity sensor; and
- providing a guidance station including a projectile control system;
- releasing the projectile from the aerial vehicle such that the projectile is driven toward the target by gravity;
- using the guidance station, remotely automatically controlling the onboard steering system of the projectile using the projectile control system to adjust a trajectory of the falling projectile to steer the projectile to the target; and
- using the onboard projectile stabilization system, automatically controlling the onboard steering system to correct an orientation of the projectile with respect to the target as the projectile approaches the target.

* * * * *